US012602039B2

(12) United States Patent
Subramanian et al.

(10) Patent No.: US 12,602,039 B2
(45) Date of Patent: Apr. 14, 2026

(54) SYSTEM AND METHOD FOR DEVELOPMENT AND DEPLOYMENT OF SELF-ORGANIZING CYBER-PHYSICAL SYSTEMS FOR MANUFACTURING INDUSTRIES

(71) Applicant: Tata Consultancy Services Limited, Mumbai (IN)

(72) Inventors: Sivakumar Subramanian, Pune (IN); Venkataraman Runkana, Pune (IN); Sai Prasad Parameswaran, Bengalaru (IN); Nital Shah, Pune (IN); Sandipan Maiti, Pune (IN); Anagha Nikhil Mehrotra, Pune (IN); Moksha Sunil Padsalgi, Pune (IN); Ratnamala Manna, Pune (IN); Rajan Kumar, Pune (IN); Sri Harsha Nistala, Pune (IN); Rohan Pandya, Pune (IN); Aditya Pareek, Pune (IN); Abhishek Krishnam Oorthy Baikadi, Bengalaru (IN); Anirudh Deodhar, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 283 days.

(21) Appl. No.: 17/926,244

(22) PCT Filed: May 19, 2021

(86) PCT No.: PCT/IN2021/050484
§ 371 (c)(1),
(2) Date: Nov. 18, 2022

(87) PCT Pub. No.: WO2021/234732
PCT Pub. Date: Nov. 25, 2021

(65) Prior Publication Data
US 2023/0195100 A1 Jun. 22, 2023

(30) Foreign Application Priority Data

May 19, 2020 (IN) .............................. 202021021089

(51) Int. Cl.
*G05B 23/02* (2006.01)

(52) U.S. Cl.
CPC ..... *G05B 23/0283* (2013.01); *G05B 23/0221* (2013.01); *G05B 23/0243* (2013.01)

(58) Field of Classification Search
CPC ........... G05B 23/0283; G05B 23/0221; G05B 23/0243; G05B 17/02; G05B 2219/23446;
(Continued)

(56) References Cited

U.S. PATENT DOCUMENTS 10,108,168 B2 10/2018 Gendelman
10,649,449 B2 * 5/2020 Bell ..................... G05B 23/024
(Continued)

FOREIGN PATENT DOCUMENTS

WO WO-2021019551 A1 * 2/2021 ............. G05B 13/04

OTHER PUBLICATIONS

Olivotti, D., Dreyer, S., Lebek, B., & Breitner, M. H. (2019). Creating the foundation for digital twins in the manufacturing industry: An integrated installed base management system. Information Systems and eBusiness Management, 17(1), 89-116. doi:https://doi.org/10.1007/s10257-018-0376-0 (Year: 2019).*
(Continued)

*Primary Examiner* — Huy Q Phan
*Assistant Examiner* — Martin Walter Braunlich
(74) *Attorney, Agent, or Firm* — Finnegan, Henderson, Farabow, Garrett & Dunner, LLP

(57) ABSTRACT
State of the art systems used for industrial plant monitoring have the disadvantage that they fail to correctly assess reason for dip in performance of the plant and in turn trigger
(Continued)

appropriate corrective measures. The disclosure herein generally relates to industrial plant monitoring, and, more particularly, to a system and method for development and deployment of self-organizing cyber-physical systems for manufacturing industries. The system monitors and collects data with respect to various parameters, from the industrial plant. If any performance dip is detected, the system determines corresponding cause, and also triggers one or more corrective actions to improve performance of the plant and different plant components to a desired performance level.

15 Claims, 11 Drawing Sheets

(58) Field of Classification Search
CPC ........ G05B 2219/14008; G05B 23/024; G06F 11/3058; G06F 11/3447; G06F 11/3466
See application file for complete search history.

(56) References Cited

U.S. PATENT DOCUMENTS

| | | | | |
|---|---|---|---|---|
| 11,796,983 | B2 * | 10/2023 | Miller | G06N 20/00 |
| 11,822,323 | B2 * | 11/2023 | Lavid Ben Lulu | G05B 23/0297 |
| 11,921,495 | B2 * | 3/2024 | Riju | G05B 19/4185 |
| 12,086,701 | B2 * | 9/2024 | Sjögren | G06V 20/698 |
| 12,099,779 | B2 * | 9/2024 | Kondejkar | G06F 30/27 |
| 2010/0286824 | A1 | 11/2010 | Solomon | |
| 2010/0332453 | A1 | 12/2010 | Prahlad et al. | |
| 2014/0359552 | A1 | 12/2014 | Misra et al. | |
| 2016/0117158 | A1 | 4/2016 | MacCleery et al. | |
| 2017/0102693 | A1 | 4/2017 | Kidd et al. | |
| 2017/0249554 | A1 * | 8/2017 | Zirnstein | G05B 23/0283 |
| 2019/0155271 | A1 | 5/2019 | Matthews et al. | |
| 2021/0116895 | A1 * | 4/2021 | Paul | G06F 11/3447 |
| 2022/0197231 | A1 * | 6/2022 | Kim | G05B 23/0254 |

OTHER PUBLICATIONS

R. Rossini et al., "AI environment for predictive maintenance in a manufacturing scenario," 2021 26th IEEE International Conference on Emerging Technologies and Factory Automation (ETFA), Vasteras, Sweden, 2021, pp. 1-8, doi: 10.1109/ETFA45728.2021.9613359. (Year: 2021).*
Zhang et al., "Agent and cyber-physical system based self-organizing and self-adaptive intelligent shopfloor," IEEE Transactions on Industrial Informatics (2016).

* cited by examiner

SYSTEM AND METHOD FOR DEVELOPMENT AND DEPLOYMENT OF SELF-ORGANIZING CYBER-PHYSICAL SYSTEMS FOR MANUFACTURING INDUSTRIES

CROSS-REFERENCE TO RELATED APPLICATIONS AND PRIORITY

The present application is a national stage application of PCT/IN2021/050484, filed on May 19, 2021 which claims priority to Indian provisional patent application no. 202021021089, filed on May 19, 2020. The entire contents of the aforementioned applications are incorporated herein by reference.

TECHNICAL FIELD

The disclosure herein generally relates to industrial plant monitoring, and, more particularly, to a system and method for development and deployment of self-organizing cyber-physical systems for manufacturing and process industries.

BACKGROUND

Manufacturing and process industries such as minerals and metals, power, chemicals and fertilizers, refineries and petrochemicals, drugs and pharmaceuticals, pulp and paper, cement, automotive, semiconductors, and food processing face a multitude of challenges in terms of uncertainties or changes in: availability and quality of raw materials, production targets, market demand for products, condition and health of the equipment or assets that are used for transforming raw materials into products, environmental conditions, regulations with respect to emissions and personal safety, etc. In order to improve the efficiency and efficacy with which such industrial plants are operating, such challenges are to be addressed, and this is where continuous monitoring of the industrial plant as a whole, and various processes and components associated with the industrial plant, comes into the picture. Such continuous monitoring helps in timely diagnosis of any of the aforementioned challenges, which in turn allows to take appropriate actions/corrective measures. However, due to the complex nature of such industrial plants, it is difficult to measure and collect information on various parameters that indicate performance of the industrial plants directly. A solution to this problem is the use of digital twins that emulate working of the plant, which can be then used to assess the performance of the plant.

In order to build a digital twin of an industrial process and/or equipment, it is imperative to develop methods that can quantitatively capture information related to their behavior, status (operating performance, health, etc.) at any instance, the influence of the control settings, the ingredients/raw materials used, and so on. A digital twin built using design/performance data of the system is expected to describe the current state of the corresponding industrial process and/or equipment and predict or forecast values of one or more process or asset health parameters in the (near) future and recommend necessary actions for its improvements. With the advent of machine learning and deep learning algorithms and abundance of data supported by IoT Platforms, industries are embracing these technologies to build digital twins or self-organizing cyber-physical systems (SOCPS) and deploy them for real-time dynamic optimization of manufacturing operations and for developing predictive maintenance schedules of the assets so as to optimize the performance of the entire industrial plant.

Even when the performance of the industrial plant is determined by directly monitoring the plant or using the digital twin, it is important to take appropriate corrective measures as there may be different reasons for the dip in performance of the plant. Disadvantage of the existing monitoring systems is that they fail to monitor and identify factors or reasons behind any determined dip in performance of the industrial plant being monitored. Triggering reason-specific action(s) may not fully resolve the detected performance related issue of the industrial plant by following a standard measure or procedure. Another disadvantage of the existing plant monitoring systems is in terms of capability to collect data required for the performance measurement. Multiple processes may be used in the industrial plant at any given time, and these interact and contribute to the overall plant performance. In order to perform a plantwide performance monitoring, it is important that all such parameters corresponding to the processes, materials, sensors, automation systems, people, environment, and equipment are monitored and their corresponding values are collected. However, the industrial plants typically have complex architectures, and it may be difficult to monitor certain parameters. For example, temperature inside a blast furnace may be too high to be measured using temperature sensors, or even if capable temperature sensors are employed, they may get damaged due to constant exposure to high temperature levels. In such scenarios, the existing plant monitoring systems fail to perform the performance monitoring as desired, and this in turn affects efficiency with which corrective measures are taken. Another disadvantage of the existing systems is they may directly process the data collected from the plant. If quality of data being collected from the plant is not sufficiently accurate, then quality of the plant performance assessment/measurement using this data also may be affected adversely.

SUMMARY

Embodiments of the present disclosure present technological improvements as solutions to one or more of the above-mentioned technical problems recognized by the inventors in conventional systems. For example, in one embodiment, a self-organizing system is provided. The self-organizing system includes a data source management module, a data ingestion module, a data synchronization and integration module, a self-monitoring module, a self-update module, a decision-making module, and a plurality of management modules. The self-organizing system performs monitoring of a manufacturing plant. The monitoring of the industrial plant involves the following steps. Initially, the self-organizing system establishes connection with one or more plant data sources of the industrial plant, using the data source management module. The self-organizing system then fetches industrial plant data from the industrial plant being monitored, using the data ingestion module. Further, the industrial plant data is pre-processed using the data synchronization and integration module, wherein the pre-processing of the industrial plant data involves merging the fetched industrial plant data with data from one or more non-real time data sources, and conditioning the industrial plant data to meet pre-defined data standards. The self-organizing system then performs analysis of the industrial plant data, using the Sensor and Actuator Monitoring Module of the self-monitoring module. The analysis involves determining whether a determined quality of the industrial plant data meets a defined threshold of quality of plant data, using the data quality verification module of the self-monitoring module. If the determined quality of the industrial plant data does not meet the defined threshold of data quality, the plant data is considered to be an instance of bad quality of data. When one or more such instances of bad quality of data are detected, then additional data is generated to compensate for the instance of bad quality of data, using the soft-sensors module of the self-monitoring module, wherein compensating for the instance of bad quality of data may involve substituting the data having quality below the threshold of quality of plant data with corresponding soft-sensor data. Further, if the determining operation of any of the plurality of components indicates a deviation from a pre-defined normal range of operation of each of the plurality of components, then the self-organizing system performs self-diagnosis using the self-diagnosis module of the self-monitoring module, which involves detecting one or more triggers. The self-diagnosis module identifies a determined performance of one or more of the behavioral models as below a threshold of performance, as a trigger for executing the self-updation of the one or more behavioral models. The self-diagnosis module identifies a determined performance level of the industrial plant below a defined benchmark of performance of the industrial plant as a trigger for executing the optimization of the industrial plant. The self-diagnosis module identifies a determined deviation of one or more of the plurality of plant components from a defined benchmark of performance of components as a trigger for executing the predictive maintenance of the component. The self-diagnosis module identifies that the user is to be alerted, if at least one triggering condition is detected. Based on the detected trigger, at least one action is recommended in response to the determined deviation from the pre-defined normal range of operation. The action is one or more of: a) optimization of the industrial plant, b) predictive maintenance of at least one of the plurality of components, c) generating alert for one or more users, and d) self-updation of one or more behavioral models that affect performance of the industrial plant. The recommended at least one action is triggered by one of the self-update module and the decision-making module, and is executed by at least one of the plurality of management modules.

In another aspect, a processor implemented method of monitoring an industrial plant is provided. The method includes monitoring a plurality of components of the manufacturing plant, via one or more hardware processors. The monitoring of the industrial plant involves the following steps. Initially, industrial plant data is collected from each of the plurality of components of the industrial plant. The industrial plant data is then pre-processed, wherein pre-processing the industrial plant data comprises conditioning the industrial plant data to meet pre-defined data standards. Further, the industrial plant data is analyzed wherein the analysis involves determining whether a determined quality of the industrial plant data meets a defined threshold of quality of plant data. The determined quality of the industrial plant data not meeting the defined threshold of quality of plant data is considered as an instance of bad quality of data. If one or more of such instances of bad quality of data are detected, then additional data is generated using soft-sensors to compensate for the determined instance of bad quality of data. Further, if the determined operation of any of the plurality of components indicates a deviation from a pre-defined normal range of operation of each of the plurality of components, then a self-diagnosis is performed, which involves detecting one or more triggers. A determined performance of one or more of the behavioral models as below a threshold of performance is identified as a trigger for executing the self-updation of the one or more behavioral models. A determined performance level of the industrial plant as being below a defined benchmark of performance of the industrial plant is identified as a trigger for executing the optimization of the industrial plant. A determined deviation of one or more of the plurality of plant components from a defined benchmark of performance of components is identified as a trigger for executing the predictive maintenance of the one or more plant components. If any trigger condition is detected, that itself is a trigger for alerting the user. Based on the detected trigger, at least one action is recommended in response to the determined deviation from the pre-defined normal range of operation. The action is one or more of a) optimization of the industrial plant, b) predictive maintenance of at least one of the plurality of components, c) generating alert for one or more users, and d) self-updation of one or more behavioral models that affect performance of the industrial plant.

In yet another aspect, a non-transitory computer readable medium for monitoring an industrial plant is provided. The non-transitory computer readable medium is comprised of a plurality of instructions, which, when executed, cause one or more hardware processors to execute the following method to perform the plant monitoring. The method includes monitoring a plurality of components of the manufacturing plant, via one or more hardware processors. The monitoring of the industrial plant involves the following steps. Initially, industrial plant data is collected from each of the plurality of components of the industrial plant. The industrial plant data is then pre-processed, wherein pre-processing the industrial plant data comprises conditioning the industrial plant data to meet pre-defined data standards. Further, the industrial plant data is analyzed wherein the analysis involves determining whether a determined quality of the industrial plant data meets a defined threshold of quality of plant data. The determined quality of the industrial plant data not meeting the defined threshold of quality of plant data is considered as an instance of bad quality of data. If one or more of such instances of bad quality of data are detected, then additional data is generated using soft-sensors to compensate for the determined instance of bad quality of data. Further, if the determining operation of any of the plurality of components indicates a deviation from a pre-defined normal range of operation of each of the plurality of components, then a self-diagnosis is performed, which involves detecting one or more triggers. A determined performance of one or more of the behavioral models as below a threshold of performance is identified as a trigger for executing the self-updation of the one or more behavioral models. A determined performance level of the industrial plant as being below a defined benchmark of performance of the industrial plant is identified as a trigger for executing the optimization of the industrial plant. A determined deviation of one or more of the plurality of plant components from a defined benchmark of performance of components is identified as a trigger for executing the predictive maintenance of the one or more plant components. If any trigger condition is detected, that itself is a trigger for alerting the user. Based on the detected trigger, at least one action is recommended in response to the determined deviation from the pre-defined normal range of operation. The action is one or more of a) optimization of the industrial plant, b) predictive maintenance of at least one of the plurality of components, c) generating alert for one or more users, and d) self-updation of one or more behavioral models that affect performance of the industrial plant.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
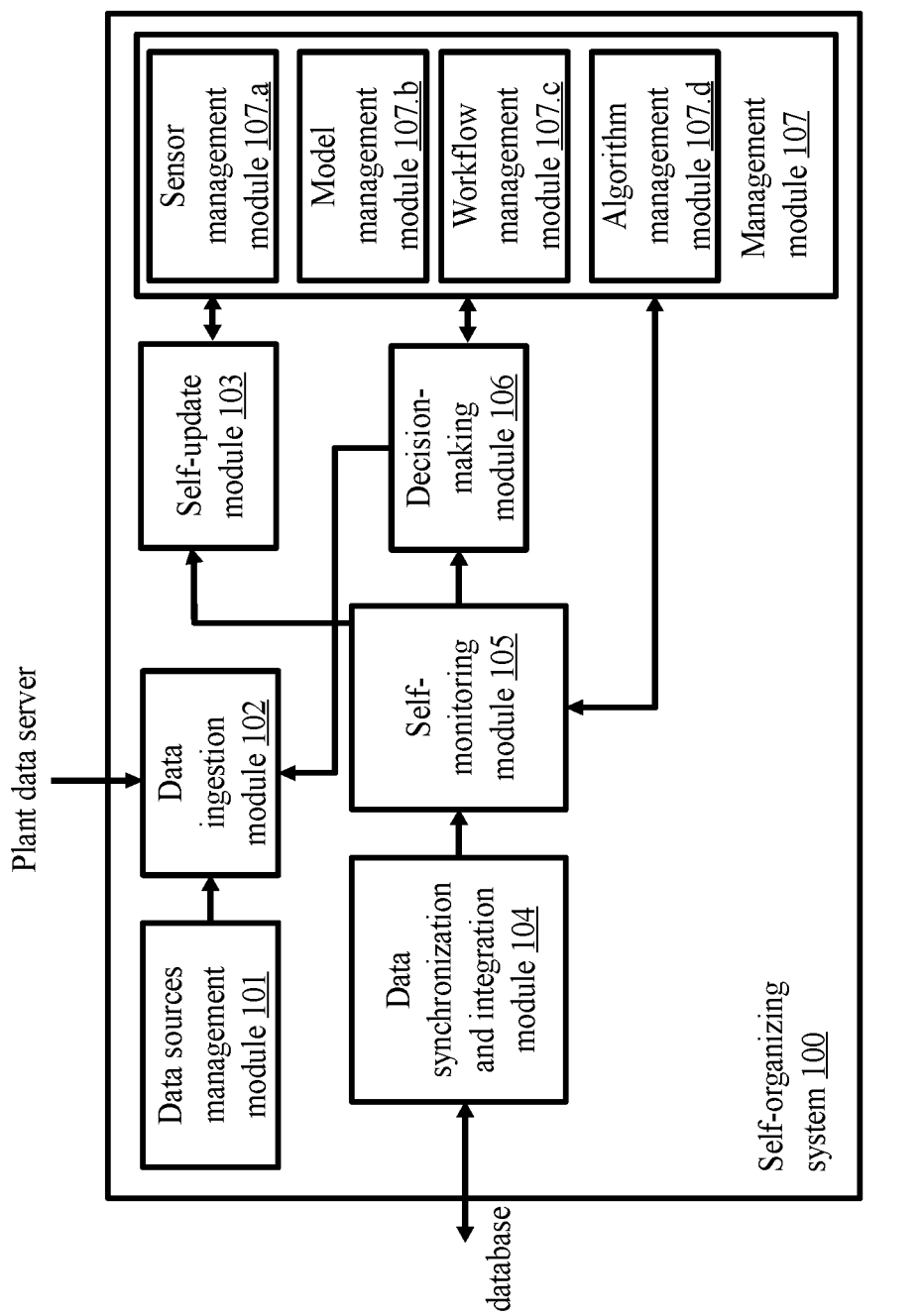
FIG. 1 illustrates an exemplary architecture of a self-organizing system, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

'Industrial plant (alternately referred to as 'plant')' is a broad term that is intended to cover plants of different types like a continuous process plant or a discrete manufacturing plant or a semi discrete-continuous plant. For example, the plant may be a steel plant, a petroleum refinery, an automobile manufacturing plant, a power plant, a drug and pharmaceutical plant, a medical devices plant, etc. The plant comprises of multiple plant components or equipment and many industrial processes are being carried out in the plant, by one or more of these plant components, at any instance when the plant is operational. For the plant to perform at expected efficiency levels and to deliver intended results, the components that constitute the plant and the different processes are to perform as desired. If any of these components and/or processes is not performing as intended, it can adversely affect various key performing indices of an industrial plant such as overall throughput and productivity of the plant, product quality, energy efficiency, rate of release of emissions or wastes or effluents, availability of the plant, cost of maintenance of equipment, number of safety related incidents, etc., and can reduce the overall efficiency at which the plant is operating.

Monitoring the plant using an appropriate monitoring system allows early and automatic detection of conditions that may lead to the dip in performance of the plant. Monitoring the plants involves collection of information/data/values on various parameters associated with the components and processes and processing the collected data to determine any performance related issue. One challenge that the existing systems face is that due to complexity of the plants, it is difficult to monitor certain parameters. Also, the performance dip of the plant may have been caused by different reasons. Existing systems fail to diagnose reason for the dip in performance.

In order to address these challenges, the method and system disclosed herein provides a mechanism of monitoring plants, determining whether performance of the plant as a whole or of any of the plant components, including sensors, actuators, and controllers and plant automation systems, is not meeting a desired performance level, and accordingly determines and triggers a corrective action. The system also provides a means to temporarily or otherwise substitute the lack of quality data through soft sensors in case the physical sensors are found to be faulty or non-functional. The soft sensors, in turn, are also monitored continuously to ascertain their performance and their behavioral models are updated, if found necessary, through self-update algorithms, to be explained subsequently. In a general sense, the soft sensors are the digital twins of the physical sensors or instruments as well as sensors for parameters that are not measured. The key elements of an industrial plant are raw materials, products, by-products, wastes or effluents or emissions, main and auxiliary equipment, sensors or instruments, plant automation systems, the environment in which the industrial plant is operating, and the people operating the plant. The self-organizing cyber-physical system (SOCPS) described here is expected to monitor the current condition and performance of the above elements of the industrial plant, diagnose the reasons for any deviations in their behavior or performance, predict key performance indicators for real-time validation of the predicted behavior, forecast the future behavior and performance of the elements as well as the industrial plant as a whole, and provide recommendations to bring the behavior and the performance of the industrial plant through various components of the SOCPS to be described later. The key component of such a SOCPS is the behavioral model of the industrial plant. In a general sense, the behavioral model may represent a prediction model, a classification model, an optimization model or any similar model that is used to represent the behavior of an industrial plant. The models themselves may be physics- or first principles-based models, data-driven models derived through statistical or machine learning or deep learning techniques, hybrid physics-based plus data-driven models, or qualitative models that may utilize techniques such as fuzzy logic for circumstances or situations that cannot be described using physics-based or data-driven models.

Referring now to the drawings, and more particularly to FIG. 1 through FIG. 11b, where similar reference characters denote corresponding features consistently throughout the figures, there are shown preferred embodiments and these embodiments are described in the context of the following exemplary system and/or method.

Figure 4:
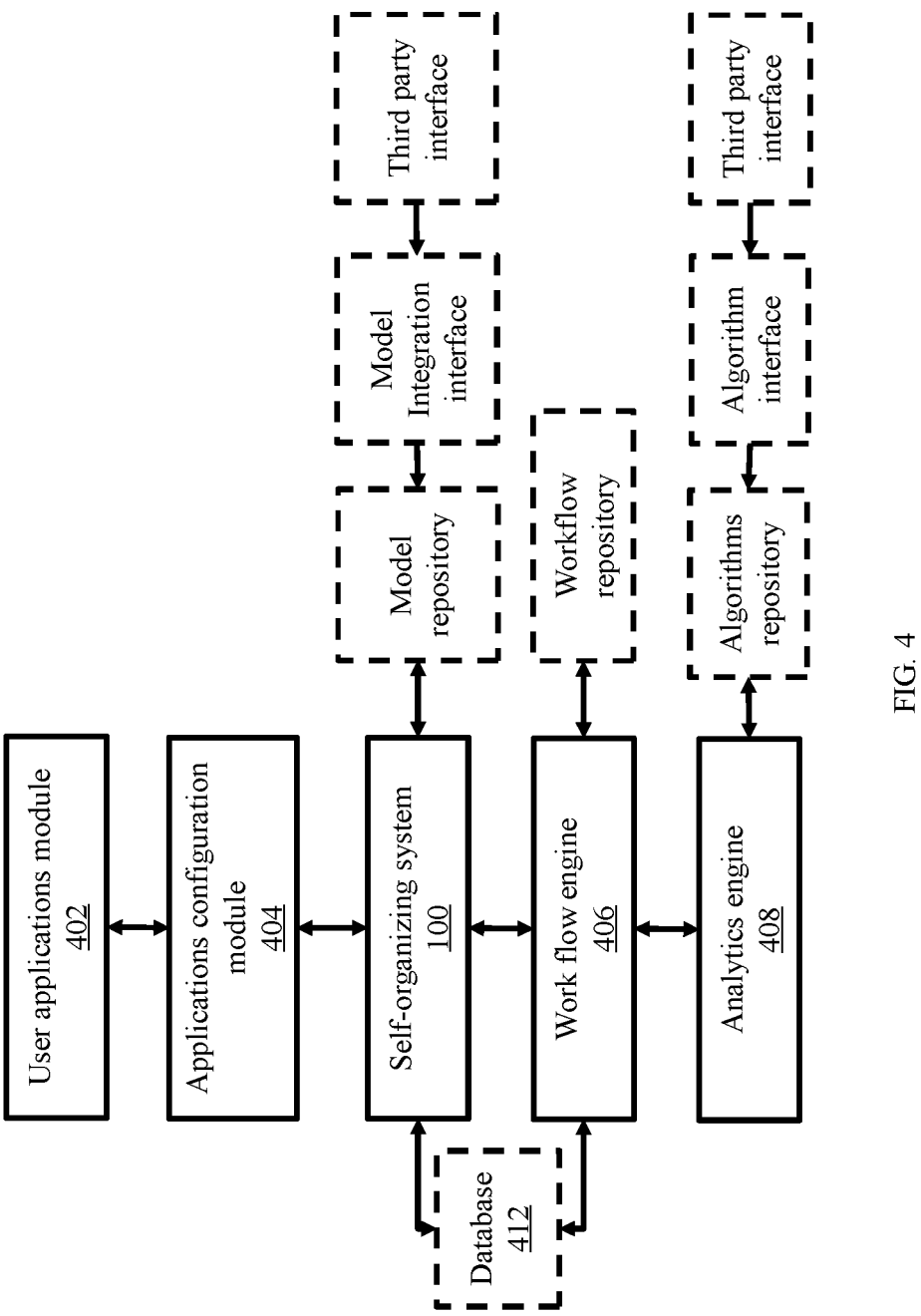
FIG. 4 is an example implementation depicting interaction of the self-organizing system with a plurality of other components of a monitoring framework, to facilitate monitoring of an industrial plant, in accordance with some embodiments of the present disclosure.

FIG. 1 illustrates an exemplary architecture of a self-organizing system, according to some embodiments of the present disclosure. The self-organizing system 100 includes a data sources management module 101, a data ingestion/interface module 102, a self-update module 103, a data synchronization and integration module 104, a self-monitoring module 105, a decision-making module 106, and a management module 107. The management module 107 further includes a sensor management module 107.a, a model management module 107.b, a workflow management module 107.c, and an algorithm management module 107.d. The plurality of management modules 107.a through 107.d are collectively referred to as management modules 107. The self-organizing system 100 may be implemented as an independent module that may be interfaced with other components in a monitoring framework (as depicted in FIG. 4), to perform monitoring of the industrial plant.

The self-organizing system 100 is configured to collect information related to various parameters associated with different processes and components in the industrial plant that are being monitored. A few examples of data that may be collected are, but not limited to, cognizance of the presence or involvement of materials, assets or equipment that transform raw materials into products, by-products and wastes or emissions, sensors that are used to measure the condition or the assets and the operations, environmental conditions in which the plant is operating, people who operate the plant and take decisions, and automation systems at the individual asset or complete plant level that help the plant operators or engineers in running the plant efficiently and safely.

The data ingestion module 102 receives real-time and non-real-time data from a plurality of plant data servers. The plant data server of any plant may store information on the various parameters specific to working of the plant, for example, physical and chemical characteristics of materials (raw materials, final products, intermediate products, by-products, solid wastes, liquid effluents, gaseous emissions, etc.), plant operating conditions (flow rates of materials, temperatures and pressures in a particular equipment or at different locations in the plant), condition of the equipment (power consumed, current drawn, scaling, fouling, vibration, etc.), environmental conditions (temperature, pressure, humidity, wind velocity, etc.), uptime of automation systems, heartbeat of an instrument signal, etc. Further, the data sources management module 101 stores information regarding connection to the plant data servers (also referred to as 'plant data sources') in the database 412, and facilitates establishing connection with the one or more plant data servers. Further, the data synchronization and integration module 104 synchronizes and merges real-time and non-real-time data from all process units in the plant considering time lags due to residence time in various units, time involved in transportation between various units and response times of sensors. The time lag information may be determined using the time lag identification module 310 of the self-diagnosis module 210, using the mechanism elaborated in Indian patent application number IN202021004042. Further, the merged data is stored in database 412. Further, the self-monitoring module 105 monitor's soft sensors, behavioral models of assets and their operational behavior and the plant comprising of various assets.

By processing the collected information, the self-monitoring module 105 determines performance of each of the plant components separately, and performance of the plant as a whole, and also the behavioral models of the industrial plants and its various components. It monitors both the physical industrial plant and its digital counterpart continuously. Monitoring of the physical plant is carried out using the data coming from the physical plant whereas monitoring of the digital plant is done using the data coming from the predictions of the behavioral model or models of the physical plant. Further, monitoring the performance separately at component level and at plant level allows to detect the dip in performance, if any, at the component level and at the plant level, so that the performance correction action(s) can be triggered at individual component level as well. Also, multiple components of the plant may together constitute different 'sections' of the plant. By processing group of data from different components that form a section, performance measurement/assessment can be done at section level as well. Values or range of values of different parameters, or of a combination of parameters, that represent an expected/desired performance of each of the components and that of a whole are stored in the database 412. The self-monitoring module 105 compares the determined performance with the expected performance and determines deviation. If deviation up to a certain limit may be allowed, a threshold of performance may be configured with the self-monitoring module 105. If the determined performance is matching the desired performance or if the deviation is below the threshold of deviation, then working of the component/process may be considered as in a 'normal range' of operation. If the determined deviation exceeds the threshold of deviation, for any component or process, then the self-monitoring module 105 determines that the component/process is outside the normal range of operation.

Figure 3:
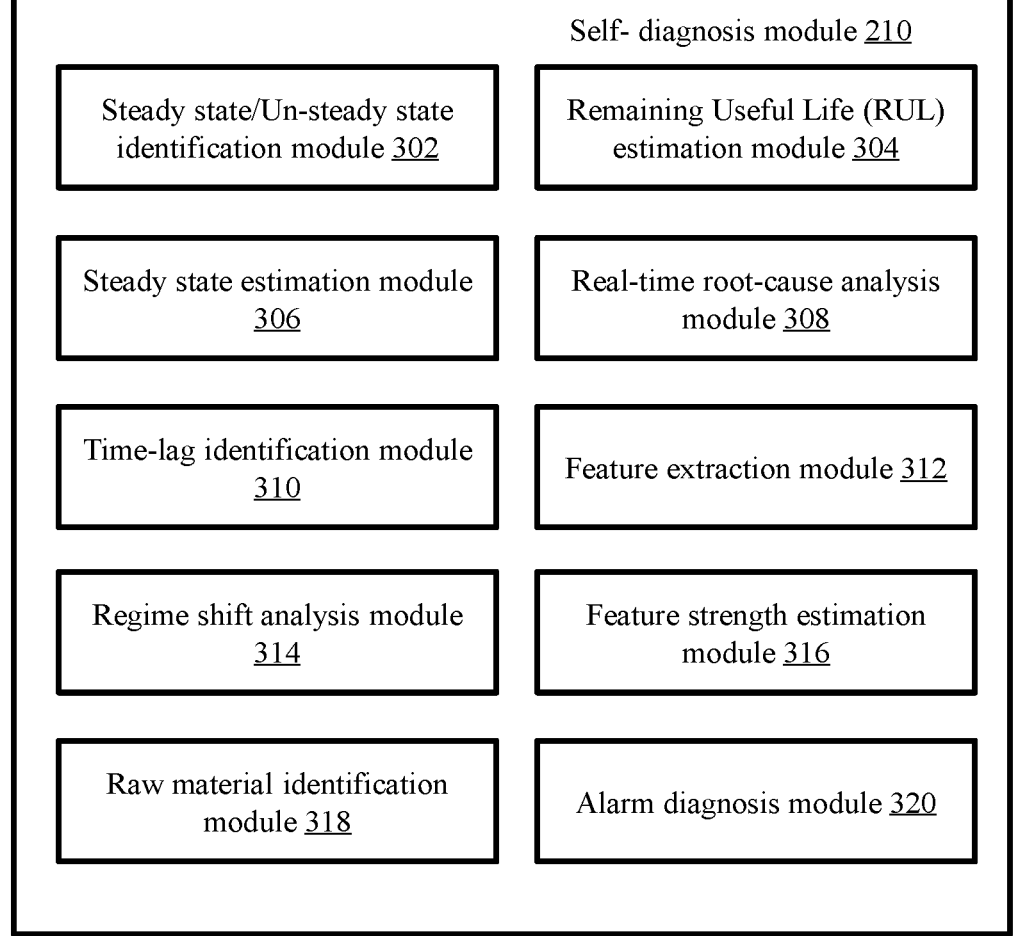
FIG. 3 is a block diagram depicting components of a self-diagnosis module of the self-monitoring module of FIG. 2, according to some embodiments of the present disclosure.

Upon detecting that the operation of at least one of the components is outside the defined normal range of operation, the self-monitoring module 105 triggers a self-diagnosis. When the self-diagnosis is triggered, the self-diagnosis module 210 of the self-monitoring module 105 determines one or more actions to be executed in response to the determined deviation. The self-diagnosis module 210 is configured to detect triggers corresponding to different actions. In an embodiment, the triggers may be detected in terms of values of different parameters or combination of parameters, as configured. The different parameters that alone or in combination form the different triggers may be measured using appropriate components of the self-diagnosis module 210 as depicted in FIG. 3. Examples of different trigger conditions are:

Condition 1: Check if a previously triggered self-optimization execution is in progress or being implemented, and if yes, wait till the ongoing execution is finished/terminated. If there is no ongoing execution, then the self-optimization may be immediately triggered.

Condition 2: Check when was the previous optimization recommended/triggered? If time elapsed since the previous execution has exceeded a threshold of time, then the self-optimization execution is triggered. Else, the Self-diagnosis module 210 may wait.

Condition 3: Check if the levels of the performance criteria are meeting the expected level. If the level is below the expected level, then the self-optimization execution is triggered.

Condition 4: Check if a process being monitored is in steady-state, and if so, then the self-optimization execution is triggered.

Likewise, different triggers may be defined in terms of parameters such as but not limited to model quality parameters, based on whether a new regime has been flagged, based on whether any new raw materials change has been detected, and so on. In another embodiment, the triggers may be defined as appropriate combination of the different parameters/conditions (for example, new material change AND regime shift).

Determined performance of one or more of the behavioral models being below a threshold of performance is identified as a trigger for executing the self-updation of the one or more behavioral models, by the self-diagnosis module 210. For example, predictions being generated by one or more of the behavioral models may not be of a desired quality i.e. quality of the predictions may be below a threshold of quality of behavioral model, and in such cases the models may be interpreted as being an underperforming model by the self-diagnosis module 210. Upon identifying this trigger, the self-diagnosis module 210 invokes the self-update module 103 to perform a self-update/self-learning mechanism to update the one or more behavioral models, using the method covered in the Indian patent application IN201921019548. The self-update module 103 includes a self-learning module 103.*a*. Similarly, a determined performance level of the industrial plant being below a defined benchmark of performance of the industrial plant is considered as a trigger for executing the optimization of the industrial plant, by the self-diagnosis module 210, and in this scenario the self-diagnosis module 210 invokes a decision-making module 106 to execute optimization of the plant. In an embodiment, even if the plant is identified as being in a steady state in terms of performance, if the self-diagnosis module 210 identifies that the plant optimization has not been carried for a time period exceeding a set time threshold, the self-optimization module 106.*b* may still be triggered by the self-diagnosis module 210. Similarly, a determined deviation of performance of one or more of the plurality of plant components from a defined benchmark of performance of components exceeding a threshold is considered as a trigger for executing the predictive maintenance of the plant components, and in this scenario the decision-making module 106 is invoked by the self-diagnosis module 210. The decision-making module 106 includes a predictive maintenance module 106.*a*, a self-optimization module 106.*b*, and an operator guidance module 106.*c*. The self-diagnosis module 210 may also be configured to generate an alert the user if any of the triggered conditions is detected. For example, the self-diagnosis module 210 may identify that one or more pre-defined types of events have already occurred or predicted to occur in the prediction horizon. In this scenario, the self-diagnosis module 210 may generate appropriate alert(s), which may also contain certain amount of information about the event(s). Generating the alert may also involve generating one or more recommendations to assist the user/operator. During the self-updation and/or predictive maintenance, the decision-making module 106 and/or the self-update module 103 triggers/invokes the sensor management module 107.*a*, the model management module 107.*b*, the workflow management module 107.*c*, and the algorithms management module 107.*d* to manage the sensors, models, workflows and algorithms, respectively, as directed by the self-update module 103 and the decision-making module 106.

The maintenance of the behavioral models of the plant and its components, and the self-updation of the behavioral models is repeated till their performance reaches a desired level to ensure the plant and its components perform at the expected levels.

Figure 2:
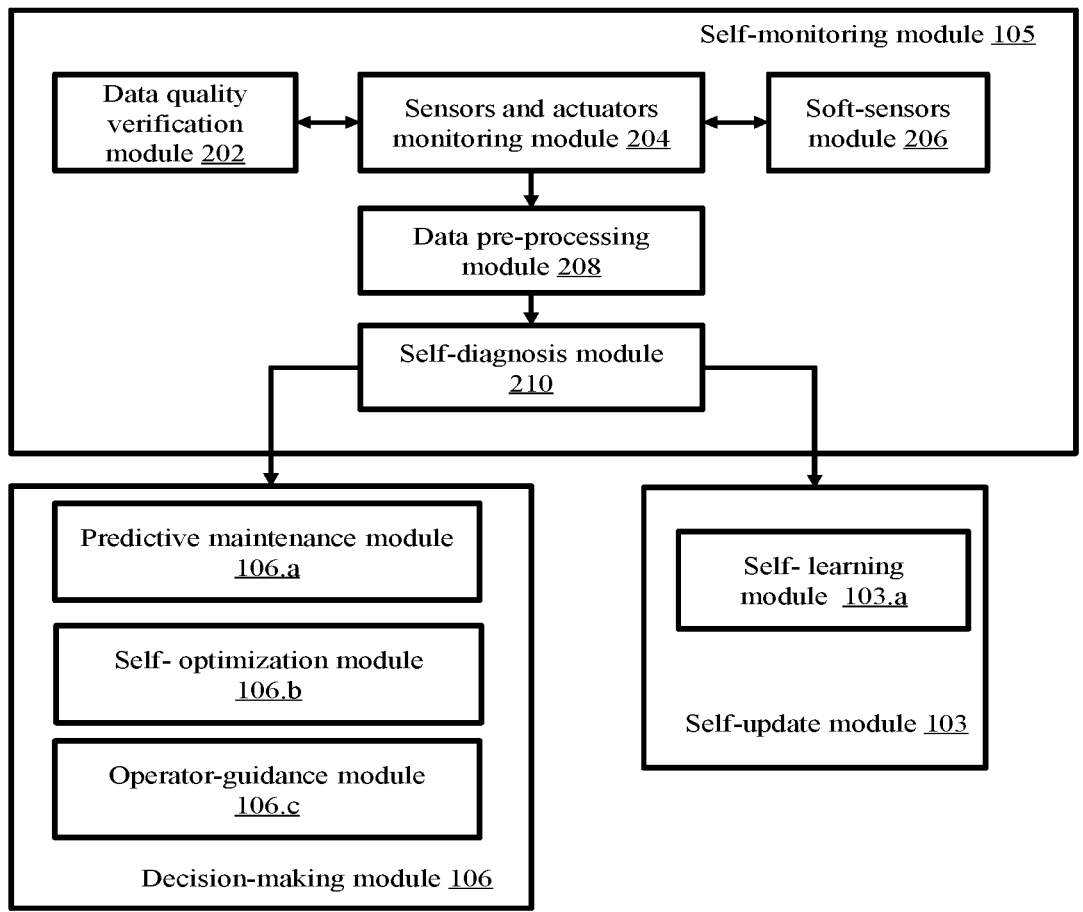
FIG. 2 is a functional block diagram depicting components of a self-monitoring module of the self-organizing system according to some embodiments of the present disclosure.

FIG. 2 is a functional block diagram depicting components of a self-monitoring module 105 of the self-organizing system 100 according to some embodiments of the present disclosure. The self-monitoring module 105 includes data quality verification module 202, sensors and actuators monitoring module 204, soft-sensors module 206, data pre-processing module 208, and self-diagnosis module 210.

The self-monitoring module 105 is configured to function at multiple levels. At a lowest level, the self-monitoring module 105 monitors plant measurements of process variables, actuator signals, or controller outputs using their corresponding soft sensors that are in essence the digital twins of corresponding physical entities. The self-monitoring module 105 monitors the assets and their operational behavior. At a highest or the global level, the self-monitoring module 105 monitors the complete industrial plant comprising of various assets, the operations/processes that are being carried out in the plant, materials and their flow, environment in which the plant operates, the people/users who operate the plant, and the automation systems that operate at the individual asset or operation level, in order to optimize the performance of the complete industrial plant at the global level. The self-monitoring module 105 makes the whole system integrated, in the sense that it works at the sensor and materials level as well as at the global industrial plant level, and links all the other self-organization features, that is, self-diagnosis, self-learning and self-optimization. The self-monitoring module 105 also uses the plant data as well as predictions of the behavioral models to monitor the many soft-sensors for any degradation in their predictive capabilities which may be caused due to a multitude of factors, for example, physical failure of the sensor, inappropriate or infrequent calibration of the sensor, degradation of the predictive capabilities of the behavioral model of a sensor, etc.

The self-monitoring module 105 receives plant data from data synchronization and integration module 104. Further, the sensors and actuators monitoring module 204 processes the received data to check if characteristics of the data are within pre-defined acceptable ranges. The sensors and actuators monitoring module 404 may use any suitable data processing means. If advanced processing of the data is required to verify the data quality, the sensors and actuators monitoring module 204 invokes data quality verification module 202 which performs advanced quality verification involving multivariate analysis or any other similar data processing means. Further, the sensors and actuators monitoring module 204 may invoke soft-sensors module 206 to get information on key internal process variables that may not be measured, measured in non-real time, difficult to measure or when a physical sensor is malfunctioning. The soft-sensors module 206 makes predictions of values of such variables with the help of a behavioral model and available data from the industrial plant. The data pre-processing module 208 further processes the data to determine if there are gaps, spikes (outliers), anomalies, etc. and imputes the missing data, or performs outlier removal. Further, the self-diagnosis module 210 monitors the process and equipment conditions based on data received from the industrial plant and the historical data, and invokes different modules to perform appropriate actions (for example, involving the decision-making module 106 and/or the self-update module 103).

FIG. 3 is a block diagram depicting components of a self-diagnosis module of the self-monitoring module 105 of FIG. 2, according to some embodiments of the present disclosure. The self-diagnosis module 210 includes steady-state/unsteady-state identification module 302, steady-state estimation module 306, time lag identification module 310, regime shift analysis module 314, raw material identification module 318, remaining useful life (RUL) estimation module 304, real-time root cause analysis module 308, feature extraction module 312, feature strength estimation module 316, alarm diagnosis module 320, and so on. The self-diagnosis module 210 monitors the process conditions and invokes different modules to perform appropriate actions. It is to be noted that the components/blocks of the self-diagnosis module 210 may change depending on types of trigger conditions defined. For example, the regime shift analysis module 314 is to be included in the self-diagnosis module 210 only if any trigger in terms of the regime shift is to be detected.

Based on the data and information received from the data pre-processing module 208, the self-diagnosis module 210 carries out several activities that may comprise identification of the current state of the plant in terms of steady or unsteady state, determination of time lags that provide an estimate of the effect of a particular independent process variable or a set of variables on a dependent variable or a set of dependent variables (this is of immense help especially when the dynamics of a manufacturing operation are slow, for example, how long does it take to see the effect of physical or chemical characteristics of a particular raw material on productivity of a process or quality of a product is one of the one key inputs required by plant operators for optimization and control of a plant), identification of the regime of operation of a plant (using the method described in Indian patent application IN201921039286) so as to understand whether to trigger the decision making module or the self-update module, detection of anomalies in the health or condition of an equipment so as to provide appropriate advice to the operators when to carry out maintenance activities of that equipment, identification of key factors that are causing degradation of the plant performance through real-time root cause analysis, extracting features from signals or time series data from the sensors and utilizing these extracted features either to provide insights to the plant operators or to provide as inputs to behavioral models of the self-organizing system. The self-diagnosis module 210 uses the components such as those listed in FIG. 3 to not only to take decision on whether to trigger either the decision making module 106 or the self-update module 103 but also to provide important data and information to the decision making module 106 and the self-update module 103 that helps in making the industrial plant operate in an autonomous manner.

FIG. 4 is an example implementation depicting interaction of the self-organizing system 100 with a plurality of other components of a monitoring framework, to facilitate monitoring of an industrial plant, in accordance with some embodiments of the present disclosure. The monitoring framework includes a user applications module 402, an applications configuration module 404, the self-organizing system 100, a workflow engine 406, an analytics engine 408, a database 412, a model repository, a model integration interface module, third party software/codes, a workflow repository, an algorithms repository, an algorithm integration interface module, and third party machine learning/deep learning/numerical algorithms.

The self-organizing system 100 ingests data from various real-time and non-real-time data sources of the industrial plant as well as archived historical data and provide real-time decisions to plant operators and engineers for optimization of Key Performance Indicators (KPIs) related to the physical system or process under consideration by working in tandem with a physical entity, namely, an asset, a unit operation or a complete industrial plant.

The monitoring framework is employed for creating the self-organizing system 100 that digitally mimics the behavior of a physical system or process in a manufacturing industry to provide near real-time decisions for improving the plant operating conditions. Initially a physical system or process of an industrial plant that has to be observed or monitored is configured with the monitoring framework through the applications configuration module 404 wherein the configuration is done in terms of assets like sensors, equipment, data sources, models, workflows and so on. Further, the self-organizing system 100 monitors the configured system or process in the real industrial plant to invoke appropriate workflows from the workflow repository. Further, the workflow engine 406 reads workflow definitions of the invoked workflows and executes the workflow steps wherein each workflow step involves one or more algorithms stored in the algorithms repository. The workflow engine 406 invokes the analytics engine 408 for executing analytics algorithms involved in workflow steps. Further, the results of workflow execution are displayed to a user through the user applications module 402.

The database 412 stores structured data like numerical values and unstructured data like text, images, sound and videos. Further, the database contains information including but not limited to data used by a plurality of services running in the monitoring framework, logs generated by plurality of services running in system 100, prebuilt domain knowledge, raw data from a plurality of plant data sources and the corresponding processed data, knowledge extracted from the plant data, knowledge acquired from publicly available sources, etc. The plant data sources may include but not limited to Distributed Control Systems (DCS), Historians, Supervisory Control and Data Acquisition Systems (SCADA), Laboratory Information Management Systems (LIMS), Manufacturing Execution Systems (MES), Enterprise Resource Planning (ERP) systems, Manufacturing Operations Management (MOM) Systems, etc.

The model repository stores a plurality of models that are invoked by the self-organizing system 100. These models capture the behaviors of a component, which may include one or more of models for soft sensors, optimization models, classification models, anomaly detection models, causal or sensitivity models, and correlation models, etc. The model repository may also contain third party software/codes (Physics-based/Machine learning (ML)/Deep Learning (DL)/Hybrid physics-based plus data-driven Models). The model integration interface module 116 enables external Machine Learning (ML) model/physics model/Hybrid physics-based plus data-driven model to work with system 100. The third party software/codes (physics-based/Machine Learning (ML)/Deep Learning (DL)/Hybrid physics-based plus data-driven Models) comply to specific guidelines and are received as user input. The workflow repository stores data related to workflows for execution by the workflow engine 406. The algorithms repository stores a plurality of machine learning or deep learning or numerical algorithms including third party Machine Learning (ML)/Deep Learning (DL)/numerical algorithms. The algorithm integration interface module enables external Machine Learning (ML)/Deep Learning (DL)/numerical algorithms to work with system 100. The third party Machine Learning (ML)/Deep Learning (DL)/numerical algorithms comply to specific guidelines and are received as user input. The numerical algorithms may include algorithms for solving a set of algebraic equations, ordinary differential equations, partial differential equations, differential-algebraic equations that are commonly employed for solving physics-based models of the manufacturing operations.

Required number of mathematical or numerical algorithms such as but not limited to Machine Learning (ML), Deep Learning (DL), Transfer Learning (TL), Reinforcement Learning (RL), and Physics Based Models (PBM) may be used to build and run/use the behavioral models. Based on requirements, these models may be individually used or in combination, to capture behavior and performance of the industrial plant. In addition, certain other algorithms such as numerical optimization algorithms are used to solve an optimization problem where the user seeks to improve the productivity of the plant keeping several business constraints expressed by these behavioral models. Optimization algorithms may be derivative based, non-derivative based, stochastic, Reinforcement Learning based and so on. Similarly, the PBMs may be linear or nonlinear algebraic or differential equations and they may be solved using appropriate numerical algorithms such the Newton-Raphson method, Runge-Kutta method, finite difference method or finite volume method, etc. All these numerical or symbolic algorithms are collectively referred here as algorithms, and may be used to form the behavioral model(s).

In an embodiment, the self-organizing system 100 may generate the behavioral models in real-time, by executing the following steps. In this process, the self-organizing system 100 collects real-time data representing characteristics of working of the industrial plant, by monitoring the industrial plant. The self-organizing system 100 also collects and stores data representing working of the industrial plant in past instances, as historical data. The self-organizing system 100 generates pre-processed data by pre-processing the real-time data and the historical data. The self-organizing system 100 then simulates values of non-measurable parameters of the industrial plant, by using physics based or data based models. The term 'non-measurable' may represent certain data that cannot be measured in real-time due to complexities of the industrial plant. In another embodiment, the term 'non-measurable' may represent certain data that could not be measured at an instance due to any temporary technical glitch. Further, an integrated data is generated by combining the pre-processed data and the simulated data. The integrated data is then used to generate each of the one or more data models. It is to be noted that the aforementioned different types of algorithms are for example purpose only, and do not intent to restrict the scope of the embodiments disclosed herein. Based on requirements, any appropriate model may be picked and used.

Figure 5:
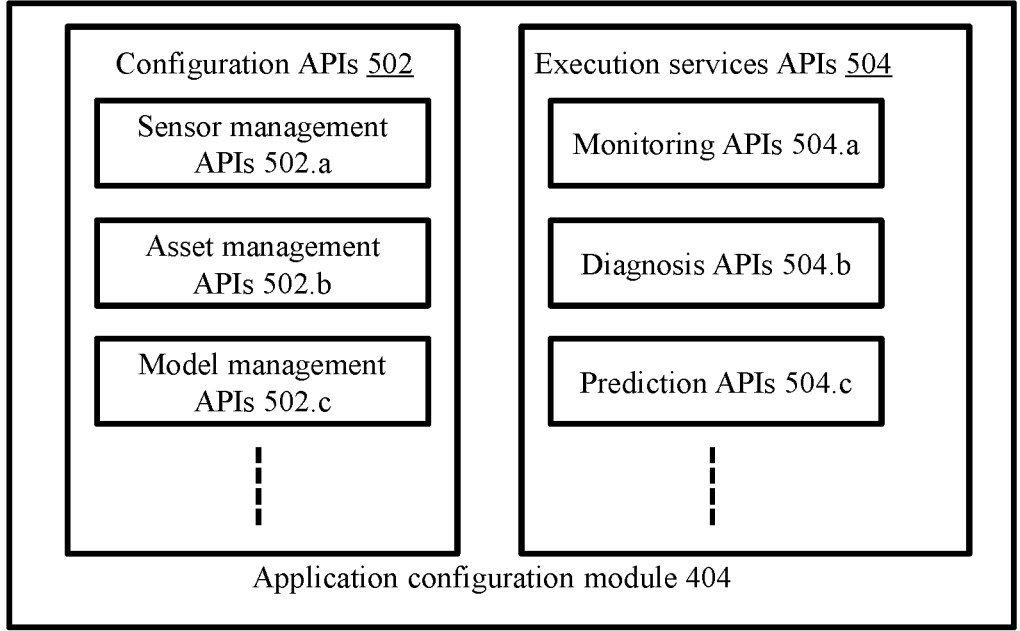
FIG. 5 is a block diagram depicting components of an application configuration module of the monitoring framework of FIG. 4, according to some embodiments of the present disclosure.

FIG. 5 is a block diagram depicting components of an application configuration module of the monitoring framework of FIG. 4, according to some embodiments of the present disclosure. The applications configuration module 404 configures a physical system or process that has to be observed or monitored through one or more Application Program Interfaces (APIs). The Application Configuration Module 404 provides two sets of RESTful Application Program Interfaces (APIs), (i) Configuration Application Program Interfaces (APIs) 502, and (ii) Execution Services APIs 504. Some of the configuration APIs 502 are, but not limited to, sensor management APIs 502.*a*, asset management APIs 502.*b*, and model management APIs 502.*c*. Similarly, the execution services APIs 504 further comprise of, but not limited to, monitoring APIs 504.*a*, diagnosis APIs 504.*b*, prediction APIs 504.*c*, and so on. Based on requirements, appropriate APIs may be used.

Figure 6:
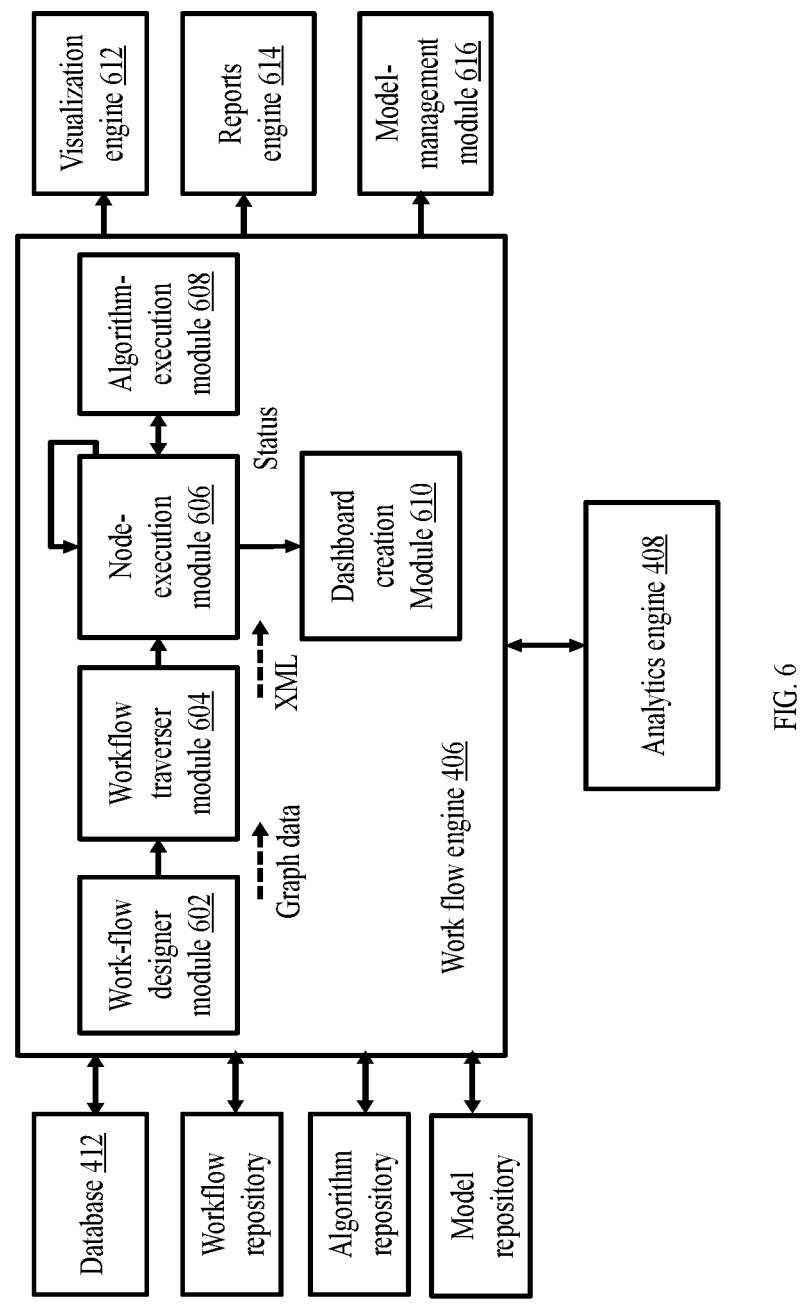
FIG. 6 is a block diagram depicting components of a workflow engine of the monitoring framework of FIG. 4, according to some embodiments of the present disclosure.

FIG. 6 is a block diagram depicting components of a workflow engine 406 of the monitoring framework of FIG. 4, according to some embodiments of the present disclosure. The workflow engine 406 allows new workflows to be generated for new applications to support the monitoring framework. The monitoring framework in FIG. 4 is created with a basic set of workflows, however, there will be a need to continuously create new workflows to meet the requirements of new applications. Besides executing specified workflows for a given application, the workflow engine 406 can also be used to create new workflows that are not already available in the monitoring framework or that cannot be configured or customized easily. The workflow engine 406 includes a workflow designer module 602, a workflow traverser module 604, a node execution module 606, an algorithm execution module 608, and a dashboard creation module 610.

The workflow engine 406 reads workflow definitions and executes the workflow steps. Initially, a workflow is created, configured and saved in the form of a graph using the workflow designer 602. Further, the workflow is executed, wherein execution of the workflow involves execution of each node of the workflow graph. The workflow traverser module 604 traverses the workflow graph, starting from the first node of a plurality of nodes. It invokes the node execution module 606 with node's configuration, data frame to be worked on and the algorithm to be executed. Further, the node execution module 606 invokes the algorithm execution module 608 for executing the algorithm. Further, the node execution module 606 sends the status to the dashboard creation module 610 and saves the results wherein the results may be in the form of transformed data, model, algorithm parameters or an update to knowledge database. The dashboard creation module 610 may use the visualization engine 612 and the reports engine 614 to generate and display the results to the user. Subsequently, the workflow traverser module 604 moves to the next node in the workflow graph and the aforementioned steps are repeated until all the nodes in the workflow are executed.

Figure 7:
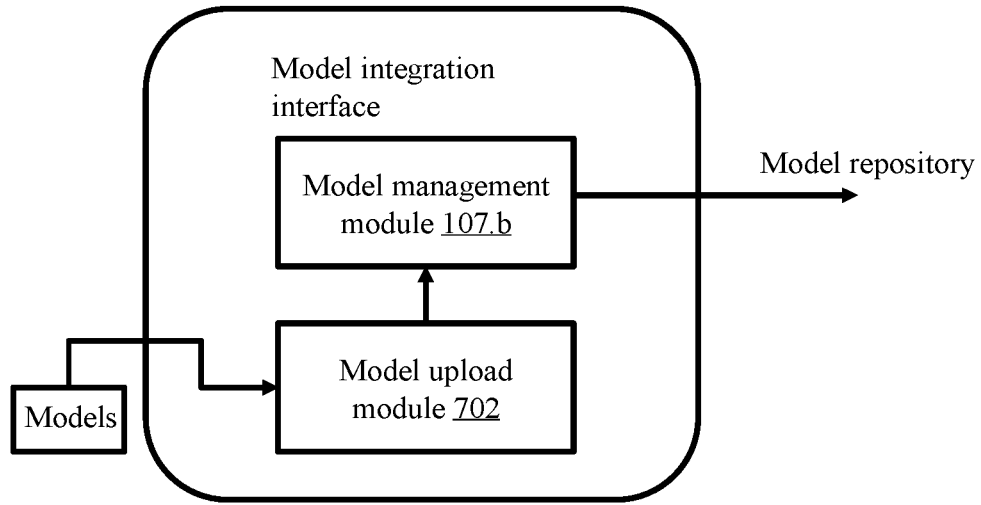
FIG. 7 is a block diagram of a model integration interface module of the monitoring framework of FIG. 4, according to some embodiments of the present disclosure.

FIG. 7 is a block diagram of a model integration interface module of the monitoring framework of FIG. 4, according to some embodiments of the present disclosure. The model integration interface enables integration of external machine/deep learning or physics-based models (executable)/Hybrid physics-based plus data-driven models so that the external models can be executed along with the existing models in the self-organizing system 100. The external models are collected as input by the model integration interface using a model upload module 702. Further, the model management module 107.*b* validates model definitions that are provided and if found valid the model definitions are added to model repository.

Figure 8:
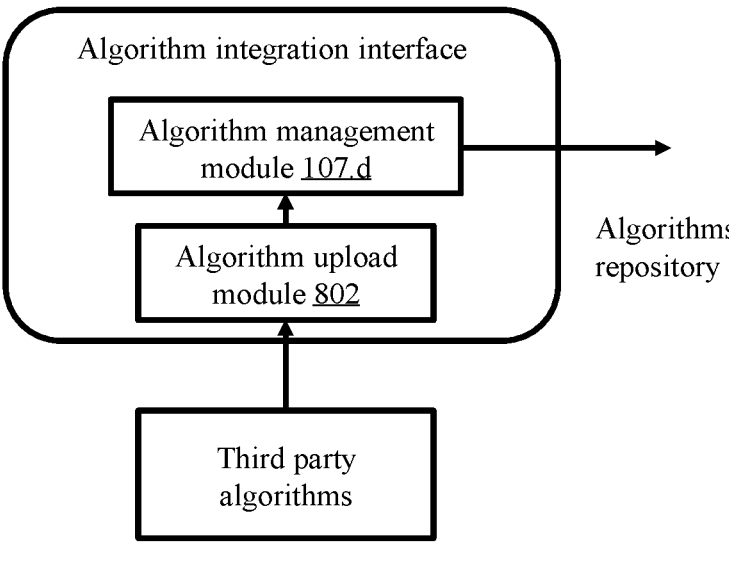
FIG. 8 is a block diagram of an algorithm integration interface module of the monitoring framework of FIG. 4, according to some embodiments of the present disclosure.

FIG. 8 is a block diagram of an algorithm integration interface module of the monitoring framework of FIG. 4, according to some embodiments of the present disclosure. The algorithm integration interface enables integration of third party machine learning (ML)/deep learning (DL)/

Numerical Algorithms 126 so that the third party algorithms can be executed along with the existing algorithms in the monitoring framework, as per requirements. The third party algorithms may be received as an input through the algorithm upload module 802. Further, the third party algorithms are validated using the algorithms management module 107.*d*, and are added to algorithm repository.

Figure 9:
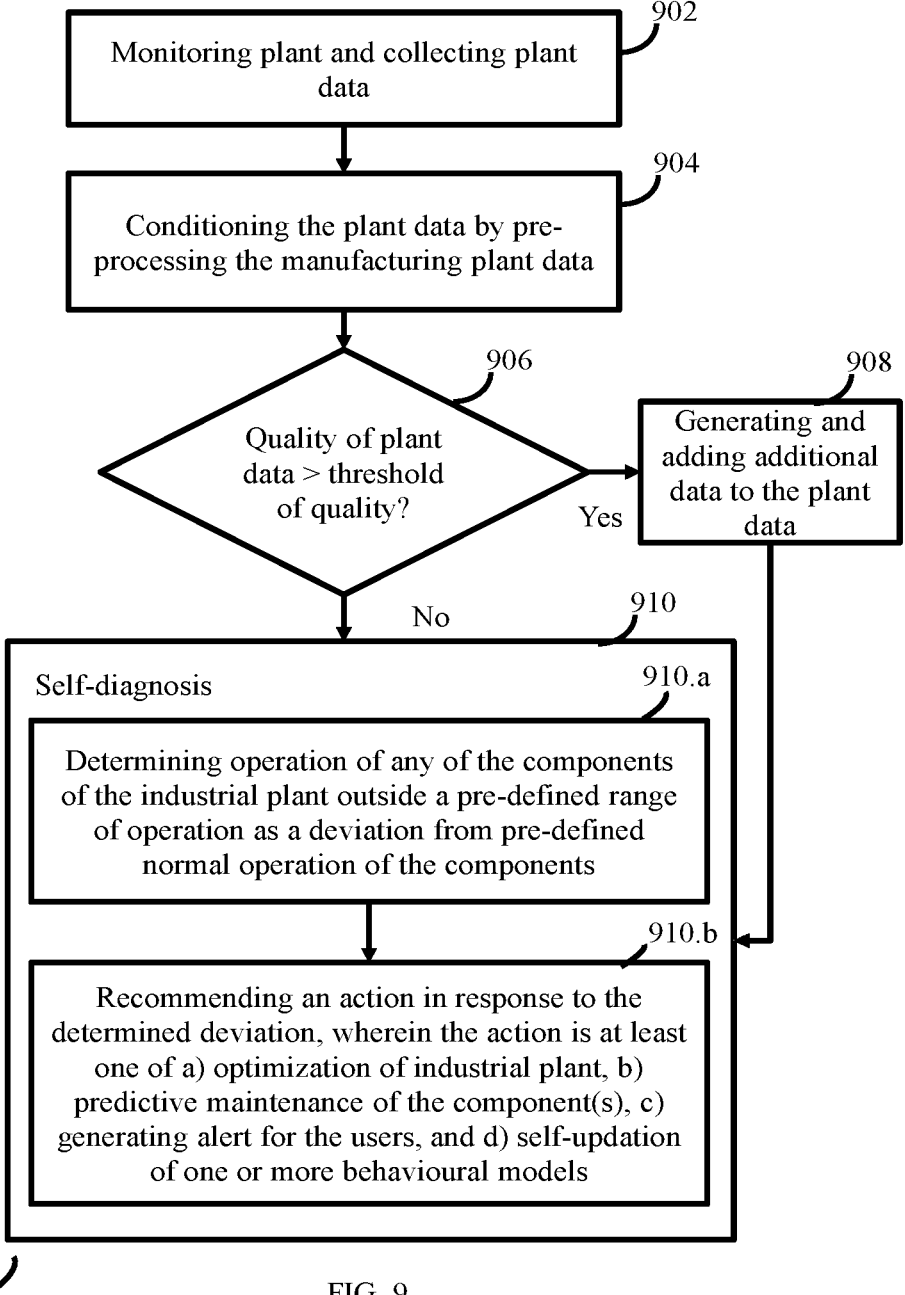
FIG. 9 is a flow diagram depicting steps involved in the process of performing monitoring of the industrial plant, using the self-monitoring module of FIG. 2, in accordance with some embodiments of the present disclosure.

FIG. 9 is a flow diagram depicting steps involved in the process of performing monitoring of the industrial plant, using the self-monitoring module of FIG. 2, in accordance with some embodiments of the present disclosure. The various modules/components of the monitoring framework, and that of the components including the self-organizing system 100 and in turn that of the self-monitoring module 105 are implementations of one or more hardware processors, though not explicitly depicted in any of the figures. A plurality of instructions which when executed using the one or more hardware processors (represented in terms of specific modules at each step), cause the monitoring of the industrial plant and the associated actions described herein.

At step 902, the self-monitoring module 105 collects the plant data from each of the plurality of components of the industrial plant, which is being monitored. At step 904, the self-monitoring module 105 conditions the collected input data by using appropriate data processing means, such that the input data is fine-tuned to meet pre-defined data standards as required for further processing. The self-monitoring module 105 then performs analysis of the plant data, using the Sensor and Actuator Monitoring Module 204. The analysis of the plant data includes the following steps. At step 906, the self-monitoring module 105 determines whether a determined quality of the industrial plant data meets a defined threshold of quality of industrial plant data. The determined quality of the industrial plant data not meeting the defined threshold of quality of industrial plant data may be interpreted as a data instance of bad quality of data by the self-monitoring module 105. The term 'instance of bad quality of data' may refer to at least a portion of the plant data, having quality below the defined threshold of quality of industrial plant data. The self-monitoring module 105 generates additional data to compensate for any determined instance of bad quality of data, using the plurality of soft-sensors which are part of the soft-sensors module 206. After improving the quality of the data as required, the self-monitoring module 105 then triggers the self-diagnosis module to perform, at step 910, self-diagnosis, to determine the action(s) to be executed in response to any detected deviation in performance levels of the plant components, and the self-diagnosis module in turn invokes appropriate module(s) that is to perform the determined action(s). At step 910.*a*, by processing the collected information, the self-monitoring module 105 determines performance of each of the plant components separately, and performance of the plant as a whole. By comparing the determined performance with the expected performance, the self-monitoring module 105 checks for and determines whether the plant and the plant components are operating outside a 'normal range' of operation, and if yes, at step 910.*b*, identifies triggers for one or more actions to be executed. Further, appropriate modules are invoked to execute the determined one or more actions till the performance of the components, the processes, and the plant are at the expected levels. In various embodiments, the steps in method 900 may be executed in the same order as depicted or in any alternate order that is technically feasible. In another embodiment, one or more steps in method 900 may be omitted.

Figure 10:
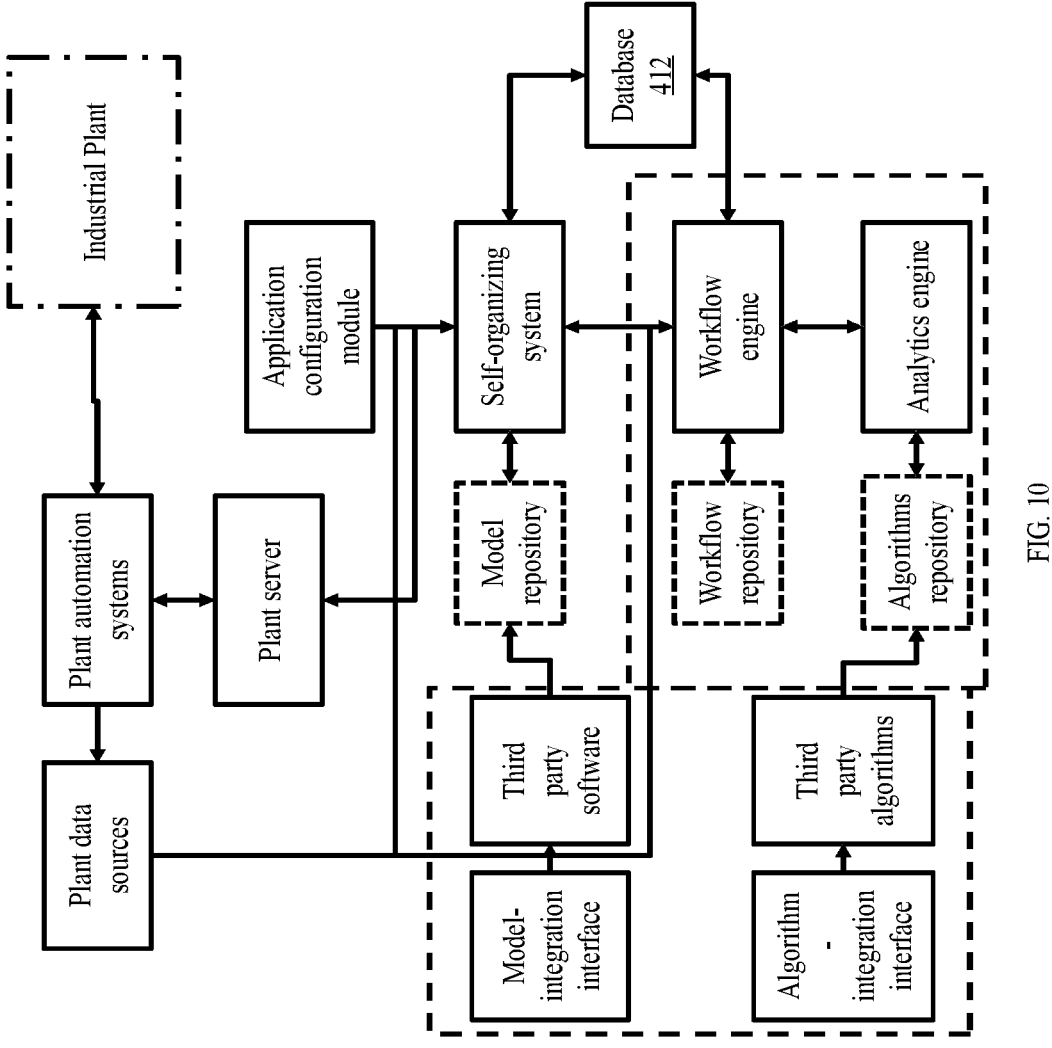
FIG. 10 depicts an example use-case scenario of use of the monitoring framework of FIG. 4, in accordance with some embodiments of the present disclosure.

FIG. 10 depicts an example use-case scenario of use of the monitoring framework of FIG. 4, in accordance with some embodiments of the present disclosure.

The real-life working mechanism of the self-organizing system 100 with its physical twin is presented in FIG. 10. Real time data flows from databases in the industrial plant to the monitoring framework/cyber-physical system. The cyber-physical system processes the real-time data as well as the historical data and reverts with real-time actionable recommendations to improve the working of the asset or a unit operation or the complete industrial plant, depending on the scope and purpose for which the self-organizing system 100 has been created. The self-organizing system 100 at the time of deployment may have certain capabilities to address the needs at the time of deployment. However, it can be updated to enhance the decision making capabilities in order to address any future requirements, accessing the real-time as well as historical data, through off-line analyses and simulations. The process of scaling the self-organizing system 100 as per requirements may be manually triggered as and when needed or may be automatic process (like a periodic maintenance). For example, simulations using physics-based models that take relatively long time for execution may be invoked at pre-defined intervals so as to provide simulated or forecasted data from the physics-based models, and this data from the physics based models are used along with the real-time data from the plant, to generate the behavioral model(s), which are then used for determining/estimating the plant performance. The simulated data may also be archived along with the corresponding real-time data in the knowledge-base for that plant for future use.

As depicted in FIG. 10, the self-organizing system 100 may be deployed along with the other components of the monitoring framework, to monitor any industrial plant. Once deployed, the self-organizing system 100 collects plant data from one or more data sources (such as the plant data sources, and plant server), or directly measures using appropriate sensors. After collecting the plant data, the process in method 900 may be executed to detect any deviation from the normal working, and detect and trigger appropriate corrective actions. Appropriate work-flows, algorithms, and other data may be selected and used as elaborated in the embodiments disclosed here. This is further explained in the use-case scenario explained below:

Use-Case Scenario:—Working of the Monitoring System 100 with a Sinter Plant

In this example use-case scenario, the plant being considered is a Sinter Plant. To understand the requirements better, working of the Sinter plant (Sinter plant process) is explained below:

Sinter Plant Process Description:—

During the iron ore sintering process iron ore fines in the size range 0.15 to 10 mm along with fluxes, solid fuel and various steel plant reverts are sintered (or fused) to form iron ore sinter in the size range 5 to 40 mm that can be charged into the blast furnace for production of pig iron. Various raw materials used in sintering, namely iron ore fines, fluxes, solid fuel and steel plant reverts are blended in a specific proportion as per the desired chemical composition of sinter and stockpiled in an open yard. Stockpiling is done to ensure chemical and physical homogeneity of the mixture. The mixture of raw materials, typically known as 'base mix', is reclaimed from the stockpile and sent to the sinter plant. At the sinter plant, solid fuel and flux are further added to the base mix to achieve to the desired chemical composition of sinter. Sinter return fines that are undersized sinter not suitable for the blast furnace and a binder that aids in granulation are also added to the base mix.

This mixture of raw materials is fed to a continuously rotating drum where water is sprinkled to aid mixing and granulation. During granulation, fine particles in the solids are attached to the coarse particles in presence of water and binder, and the resultant mixture with narrower size distribution and larger mean size is known as 'green mix'. The green mix is fed to a continuously moving sintering strand in the form of a bed of a certain height and width. The top surface of the bed is ignited at high temperatures of 1100-1200° C. using an ignition hood to initiate combustion of solid fuel present in the green mix. The ignition is sustained using continuous suction from the top of the bed towards the bottom of the bed using multiple wind boxes. The flame front formed by combustion of solid fuel reaches the bottom of the green mix near the discharge end of the furnace.

The location of flame front decides the temperature of off-gas flowing through the wind boxes. The maximum off-gas temperature, known as burn-through point (BTP) is a crucial indicator of the sintering process on the strand. It is closely monitored and controlled by manipulating variables such as strand speed, ignition hood temperature and suction. It is also dependent on the porous bed characteristics such as mean size, porosity and moisture content all of which are dictated by the granulation process. During sintering, the green mix undergoes various physio-chemical processes such as drying of moisture, combustion of fuel, calcination of fluxes, and melting and solidification. At the end of this process, the green mix is transformed into a sinter cake and is discharged from the sinter strand onto a crusher and subsequently a forced draft annular cooler. After the crushed sinter cake cools down in the cooler, it is further crushed and screened to remove undersized particles (<5 mm) known as return fines. The product sinter, typically in the size range 5-40 mm, is transported to the blast furnace via conveyor belts.

Technical Problem:—

In many sinter plants, iron ore and fluxes are procured from multiple sources leading to frequent changes in the chemical composition and size distribution of these materials that disturb the sintering operation and the sinter quality. However, sinter quality is only available periodically (every 4 to 24 hours) as samples of sinter are periodically collected and analyzed at the laboratory for their chemical composition, size distribution, cold strength (tumbler index) and high temperature properties (reduction degradation index). As the quality of sinter is not known in real-time, any corrective action needed to maintain the quality of sinter is delayed leading to wide variation in sinter quality and sub-optimal operation of the sinter plant. To address this problem, predictive models can be developed using machine learning techniques for sinter quality parameters using historical operating data of the plant as well as laboratory data. Such models can forecast the quality of sinter 2-4 hours in advance giving the operators ample time to adjust the plant to maintain sinter quality without having to wait for laboratory test results. For example, a machine learning model can be developed for Tumbler Index of sinter using operating data of the plant, for example feed solids flow rates, binder percentage, moisture content, bed height, strand speed, ignition conditions, suction, cooler bed height, cooler pressure, etc., as well as laboratory data, for example feed solids size distribution, feed solids chemical composition, green mix size distribution, etc., and can be used to get predicted values of Tumbler Index in real time without waiting for 2-4 hours for laboratory analysis. Once the measurements of samples collected become available, they can be compared to the corresponding predicted values.

However, predictive models such as the one developed for Tumbler Index are strongly dependent on the input variables used in the model and may give out incorrect predictions when the values of the input variables are not within certain prescribed ranges. In the case of Tumbler Index, the model is strongly dependent on ignition temperature which is the temperature of the ignition hood and is typically measured at 4-6 locations in the ignition hood. The temperature in the ignition hood is typically in the range of 1100-1250° C. Due to such high temperatures, the thermocouples placed in the ignition hood burn out occasionally and record erroneous values (lower temperatures such as 1000° C. or very low values such as 5° C.). These erroneous values can then lead to incorrect predictions of Tumbler Index. The operators may unnecessarily act upon these incorrect predictions to adjust the sinter quality and end up disturbing the smooth operation of the plant. It is therefore critical to detect, diagnose and fix all incorrect/erroneous measurements in real-time to ensure that the plant operation is smooth and sinter quality is maintained at all times.

Problem Addressed:—

The problem of erroneous measurements, and their impact on quality predictions and subsequently the operation of the sinter plant can be addressed using the system and method disclosed herein. Considering the problem of erroneous ignition temperatures and their impact of tumbler index predictions, the sensors and actuators monitoring module 204 monitor ignition temperatures in real-time to check if the readings are within prescribed limits of 1150 and 1250° C. When the measurements are lower than 1150° C. due to failure of one of the several thermocouples, the sensors and actuators monitoring module 204 invokes the data quality verification module 202 which performs advanced multivariate data preprocessing analysis involving all the ignition hood temperature measurements. From the analysis, it is judged if the drop in temperature is consistent across all the thermocouples indicating that it could be process abnormality, for example drop in fuel flow or combustion air flow to the burners or if the drop in temperature is localized to one of the thermocouples, then it would indicate a sensor issue, for example thermocouple burnout. If the root cause of the problem is identified to be thermocouple burnout in one of the thermocouples, then the operator is alerted accordingly. Simultaneously, the soft sensor for ignition temperature (for the failed thermocouple) is activated and the prediction of Tumbler Index continues with the soft-sensed values of ignition temperature instead of the incorrect measured values. A similar approach would be followed when a group of sensors, values of actuator signals, do not comply with expected patterns or values captured by the behavioral models. It can be seen that soft-sensor models for all the measurements, actuator inputs or controller signals substitute when the actually reported values become unreliable, when the data is established to be reliable, they are used to ascertain the quality of the model. When the prediction accuracy of the model deviates the desired level for various reasons, the self-diagnosis module 210 is triggered.

Figure 11A:
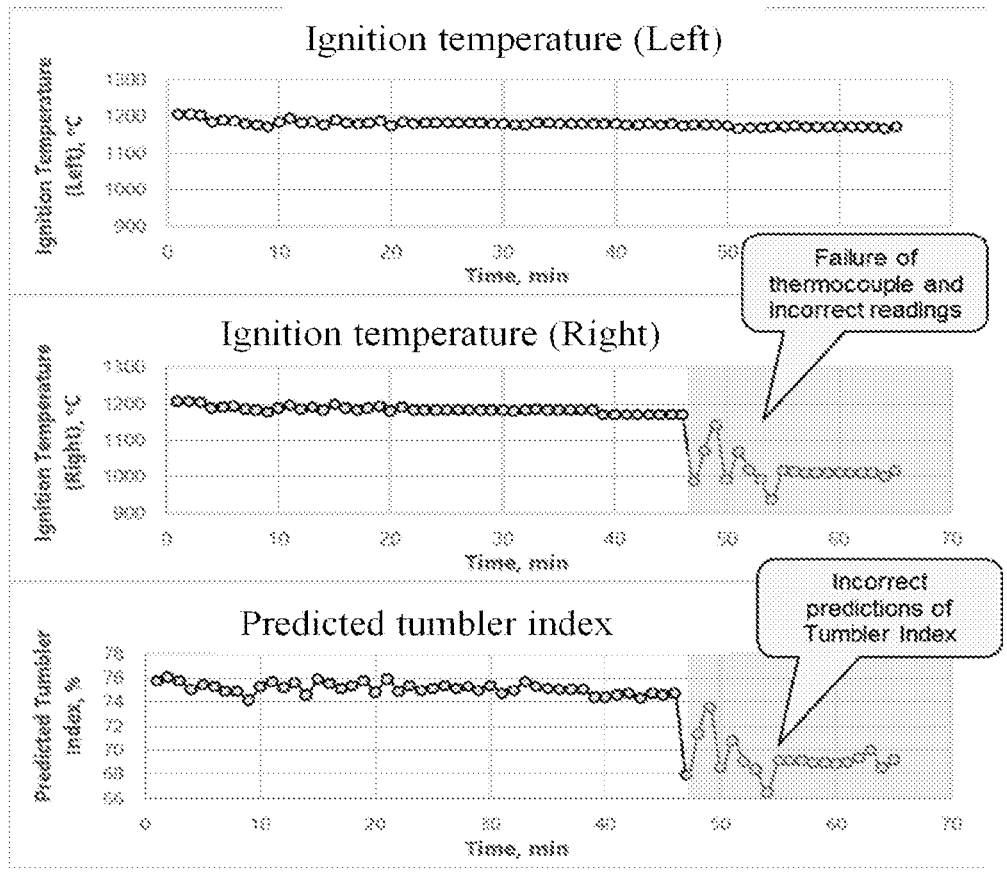
FIGS. 11*a* and 11*b* are graphical representations depicting quality of predictions without and with using the self-organizing system of FIG. 1, in accordance with some embodiments of the present disclosure.
Figure 11B:
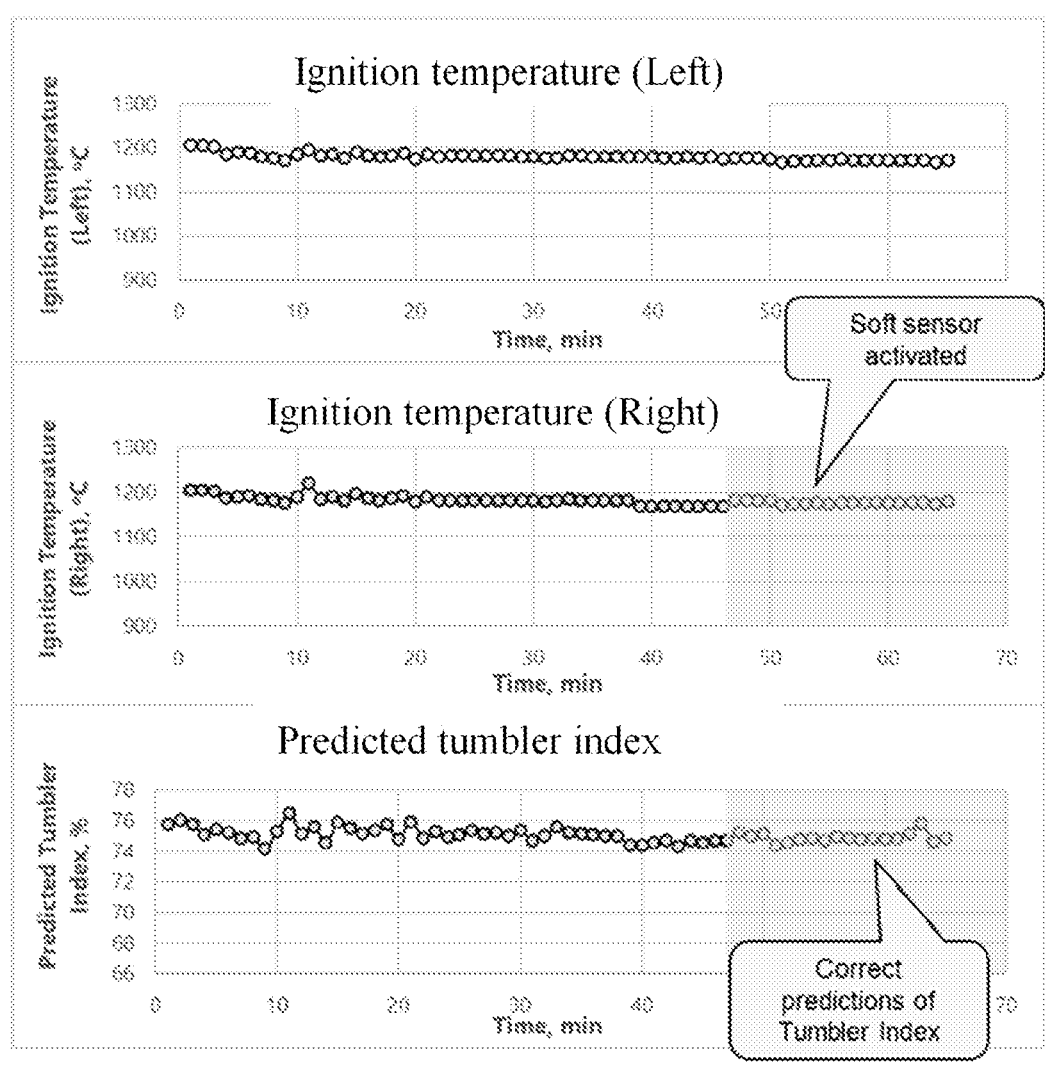

Trend in ignition temperatures and predictions of Tumbler Index without and with the use of the self-organizing system 100 are depicted in FIGS. 11a and 11b respectively. As evident from FIG. 11a, without the mechanism disclosed herein, the tumbler index predictions appear to be incorrect, due to incorrect readings caused by failure of thermocouple. However, when the failure of the thermocouple is detected, the self-organizing system 100 activates the soft-sensors, and the soft-sensor data substitutes the incorrect data coming from the failed thermocouple. As a result, the corresponding predictions remain correct. This is depicted in FIG. 11*b*.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of industrial plant monitoring. The embodiment, thus provides a method and system for determining whether performance of the industrial plant is outside a defined normal range of operation. Moreover, the embodiments herein further provide a mechanism to trigger actions such as but not limited to maintenance of plant, self-updation of behavioral models, and so on to improve performance of individual plant components and the overall plant.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

The invention claimed is:

1. A self-organizing system configured to monitor an industrial plant, by: establishing connection with one or more plant data sources of the industrial plant by storing information regarding the connection to the one or more plant data sources in a database; fetching industrial plant data from the industrial plant, wherein real-time and non-real-time data is received from a plurality of industrial plant data servers, wherein the plurality of industrial plant data servers of the industrial plant stores information of a plurality of parameters specific to working of the industrial plant including physical and chemical characteristics of materials, industrial plant operating conditions, condition of equipment, environmental conditions, uptime of automation systems, heartbeat of an instrument signal; pre-processing the industrial plant data, comprising merging the fetched industrial plant data with data from one or more non-real time data sources and conditioning the industrial plant data to meet pre-defined data standards, wherein the real-time and non-real-time data from all process units in the industrial plant are synchronized and merged, considering time lags; determining operation of any of a plurality of industrial plant components outside a pre-defined range of operation in a multi-layered interacting structure, as a deviation from a pre-defined normal range of operation of each of the plurality of industrial plant components, wherein determined performance is compared with an expected performance to determine the deviation, wherein when a determined deviation is below a threshold of the deviation, then working of a component is in a 'normal range' of operation, wherein when the determined deviation exceeds the threshold of the deviation, then working of the component is 'outside the pre-defined normal range of operation', and wherein the plurality of industrial plant components includes sensors, actuators, and controllers, wherein upon determining quality of the industrial plant data, soft sensors substitutes lack of quality of data in case physical sensors are found to be faulty or non-functional, wherein the soft sensors, are digital twins of the physical sensors, are monitored continuously to ascertain performance and corresponding behavioral models are updated; monitoring the performance separately at component level and at plant level continuously; and recommending at least one action in response to the determined deviation from the pre-defined normal range of operation, wherein the action is one or more of a) optimization of the industrial plant, b) predictive maintenance of at least one of a plurality of components, c) generating an alert for one or more users, and d) self-updation of one or more behavioral models that affect performance of the industrial plant, wherein the recommended at least one action is triggered, wherein the alert is generated upon identifying one or more pre-defined types of events which occurred or which were predicted to occur in a prediction horizon and the alert contains information about an event and one or more recommendations to assist the one or more users or an operator, wherein the one or more behavioral models represent a prediction model, a classification model, an optimization model representing behavior of the industrial plant, detecting trigger conditions for the recommended at least one action in terms of values of different parameters or combination of parameters, as configured, wherein the trigger conditions comprises: determining whether a previously triggered self-optimization execution is in progress or being implemented; waiting till the previously triggered self-optimization execution is terminated in response to determining that the previously triggered self-optimization execution is in progress; triggering a self-optimization in response to determining that there is no ongoing previously triggered self-optimization execution; determining whether a time elapsed after a previous execution exceeded a threshold of time; triggering a self-optimization execution in response to determining that the time elapsed after the previously triggered self-optimization execution exceeded the threshold of time; waiting to trigger the self-optimization execution till the time elapsed exceeds the threshold of time, in response to determining that the time elapsed after the previously triggered self-optimization execution is within the threshold of time; wherein the trigger conditions are defined in terms of model quality parameters, upon detecting that a new regime is flagged and a change in raw materials, wherein a step of determining a deviation and recommending at least one action comprises: performing analysis of the industrial plant data, comprising: determining whether a determined quality of the industrial plant data meets a defined threshold of quality of plant data, wherein the determined quality of the industrial plant data not meeting the defined threshold of quality of plant data is considered; generating additional data to compensate for a determined instance of bad quality of data to improve quality of the industrial plant data, wherein the self-organizing system is configured to function at multiple levels including a lowest level and a global level, wherein at the lowest level, the self-organizing system monitors plant measurements of process variables, actuator signals, or controller outputs using their corresponding soft sensors and at the global level, the self-organizing system monitors the industrial plant comprising of a plurality of assets, operations or processes that are carried out in the industrial plant, materials and their flow, an environment in which the industrial plant operates, the one or more users operating the industrial plant, and automation systems that operate at an individual asset or operation level, to optimize performance of the industrial plant at the global level, wherein the self-organizing system uses the industrial plant data and predictions of the one or more behavioral models to monitor the soft sensors for degradation in their predictive capabilities which are caused due to a plurality of factors including a physical failure of a sensor, inappropriate or infrequent calibration of the sensor, degradation of the predictive capabilities of the one or more behavioral models of the sensor, wherein industrial plant operators act upon the predictions of the one or more behavioral models to adjust quality of the industrial plant data, wherein the self-organizing system provides real-time decisions to the industrial plant operators for optimization of Key Performance Indicators (KPIs) related to a physical system or process under consideration by working with a physical entity including the asset, a unit operation or the complete industrial plant, wherein the self-organizing system is deployed and updated further to enhance decision making capabilities for future requirements, wherein simulated data is archived with corresponding real-time data in a knowledge-base for the industrial plant for future use.

2. The self-organizing system as claimed in claim 1, performing self-diagnosis, comprising: identifying a determined performance of the one or more behavioral models as below a threshold of performance, as a trigger for executing the self-updation of the one or more behavioral models; identifying a determined performance level of the industrial plant below a defined benchmark of performance of the industrial plant as a trigger for executing the optimization of the industrial plant; identifying a determined deviation of one or more of the industrial plant components from a defined benchmark of performance of components as a trigger for executing the predictive maintenance of the one or more of the industrial plant components; and identifying that the one or more users is to be alerted, if at least one triggering condition is detected.

3. The self-organizing system as claimed in claim 2, recommends the self-updation of one or more behavioral models by: determining quality of one or more model predictions generated by the one or more behavioral models; and invoking a self-learning mechanism if a determined quality of at least one of the one or more behavioral models is below a threshold of quality of the one or more behavioral models, wherein the self-learning mechanism updates at least one of the one or more behavioral models.

4. The self-organizing system as claimed in claim 1, wherein the self-organizing system generates each of the one or more behavioral models by: collecting real-time data representing characteristics of working of the industrial plant, by monitoring the industrial plant; collecting and storing data representing working of the industrial plant in past instances, as historical data; generating pre-processed data by pre-processing the real-time data and the historical data; simulating values of non-measurable parameters of the industrial plant, by using physics based or data based models; generating integrated data by combining the pre-processed data and the simulated data; and generating each of the one or more behavioral models using the integrated data.

5. The self-organizing system as claimed in claim 1, wherein a plurality of management modules comprise one or more of a sensor management module, model management module, workflow management module, and algorithm management module, wherein the plurality of management modules are configured to manage sensors, data models, workflows, and algorithms that are used for monitoring the industrial plant based on instructions from a self-monitoring module.

6. The self-organizing system as claimed in claim 5, wherein a workflow engine generates one or more workflows for an application, by: creating at least one workflow for the application, wherein the workflow is saved in the form of a workflow graph; executing the workflow, comprising executing for each of a plurality of nodes in the workflow graph: traversing the workflow graph; executing an algorithm; displaying values of a plurality of algorithm parameters as result of execution of the algorithm saving results in a form of a transformed data model, the plurality of algorithm parameters or an update to knowledge database; displaying the results and subsequently move to a next node, among the plurality of nodes, in the workflow graph; and repeating steps of the creating at least one workflow for the application, the traversing the workflow graph, executing the algorithm and the displaying values of a plurality of algorithm parameters as result of execution until all the plurality of nodes in the workflow graph are executed.

7. The self-organizing system of claim 1, wherein, the self-organizing system is interfaced with the industrial plant in communication with the self-organizing system, the self-organizing system monitors the industrial plant, the self-organizing system invokes a plurality of workflows of the industrial plant in communication with the self-organizing system, the self-organizing system executes one or more analytics algorithms in workflow steps, in communication with the self-organizing system, the self-organizing system displays results of workflow execution in communication with the self-organizing system, the self-organizing system stores data associated with the industrial plant monitoring in a plurality of databases comprising a model repository, a workflow repository, an algorithms repository, and a common repository, which are stored in a memory module in communication with the self-organizing system, the self-organizing system interfacing with one or more external behavioral models using a model integration interface module in communication with the self-organizing system, the self-organizing system interfacing with one or more third party modules using a third party software interface in communication with the self-organizing system, and the self-organizing system interfacing with one or more external algorithms using an algorithm integration interface module in communication with the self-organizing system.

8. A processor implemented method of monitoring an industrial plant, comprising: monitoring (902) a plurality of components of the industrial plant by a soft sensor which is digital twins of physical sensors; and performing a self-monitoring of the industrial plant, wherein the self-monitoring comprises a self-diagnosis comprising steps of: determining (910.*a*) operation of any of the plurality of components outside a pre-defined range of operation in a multi-layered interacting structure, as a deviation from a pre-defined normal range of operation of each of a plurality of industrial plant components, using one or more hardware processors, wherein determined performance is compared with an expected performance to determine the deviation, wherein when a determined deviation is below a threshold of the deviation, then working of a component is in a 'normal range' of operation, wherein when the determined deviation exceeds the threshold of the deviation, then working of the component is 'outside the pre-defined normal range of operation', and wherein the plurality of industrial plant components includes sensors, actuators, and controllers, wherein upon determining quality of plant data, soft sensors substitutes lack of quality of data in case physical sensors are found to be faulty or non-functional, wherein the soft sensors, are digital twins of the physical sensors, are monitored continuously to ascertain performance and corresponding behavioral models are updated; monitoring the performance separately at component level and at plant level continuously; and recommending (910.*b*) at least one action in response to the determined deviation from the pre-defined normal range of operation, via the one or more hardware processors, wherein the action is one or more of a) optimization of the industrial plant, b) predictive maintenance of at least one of the plurality of components, c) generating an alert for one or more users, and d) self-updation of one or more behavioral models that affect performance of the industrial plant, wherein the recommended at least one action is triggered, wherein the alert is generated upon identifying one or more pre-defined types of events which occurred or were predicted to occur in a prediction horizon and the alert contains information about an event and one or more recommendations to assist the one or more users or an operator, wherein the one or more behavioral models represent a prediction model, a classification model, an optimization model used to represent behavior of the industrial plant, detecting trigger conditions for the recommended at least one action in terms of values of different parameters or combination of parameters, as configured, wherein the trigger conditions comprises: determining whether a previously triggered self-optimization execution is in progress or being implemented; waiting till the previously triggered self-optimization execution is terminated in response to determining that the previously triggered self-optimization execution is in progress; triggering a self-optimization in response to determining that there is no ongoing previously triggered self-optimization execution; determining whether a time elapsed after a previous execution exceeded a threshold of time; triggering the self-optimization execution in response to determining that the time elapsed after the previous execution exceeded the threshold of time; waiting to trigger the self-optimization execution till the time elapsed exceed the threshold of time, in response to determining that the time elapsed after the previously triggered self-optimization execution is within the threshold of time; wherein the trigger conditions are defined in terms of model quality parameters, upon detecting that a new regime has been flagged and a change in raw materials, wherein determining a deviation and recommending at least one action comprises: performing analysis of the industrial plant data, comprising: determining whether a determined quality of the industrial plant data meets a defined threshold of quality of plant data, wherein the determined quality of the industrial plant data not meeting the defined threshold of quality of plant data is considered as an instance of bad quality of data; generating additional data to compensate for any determined instance of bad quality of data to improve quality of the industrial plant data, wherein the method is performed at multiple levels including a lowest level and a global level, wherein at the lowest level, the method monitors plant measurements of process variables, actuator signals, or controller outputs using their corresponding soft sensors and at the global level, the method monitors the industrial plant comprising of a plurality of assets, operations or processes that are carried out in the industrial plant, materials and their flow, an environment in which the industrial plant operates, the one or more users operating the industrial plant, and automation systems that operate at an individual asset or operation level, to optimize performance of the industrial plant at the global level, wherein the method uses the industrial plant data and predictions of the one or more behavioral models to monitor the soft sensors for degradation in their predictive capabilities which are caused due to a plurality of factors including a physical failure of a sensor, inappropriate or infrequent calibration of the sensor, degradation of the predictive capabilities of the one or more behavioral models of the sensor, wherein industrial plant operators act upon the predictions of the one or more behavioral models to adjust quality of the industrial plant data, wherein the method provides real-time decisions to the industrial plant operators for optimization of Key Performance Indicators (KPIs) related to a physical system or process under consideration by working with a physical entity including the asset, a unit operation or the complete industrial plant, wherein a self-organizing system is deployed and updated further to enhance decision making capabilities for future requirements, wherein simulated data is archived with corresponding real-time data in a knowledge-base for the industrial plant for future use.

9. The processor implemented method of monitoring an industrial plant as claimed in claim 8, wherein determining the deviation and recommending the at least one action by performing the self-monitoring comprises: collecting (902) the industrial plant data from each of the plurality of components of the industrial plant; pre-processing (904) the industrial plant data, wherein pre-processing the industrial plant data comprises conditioning the industrial plant data to meet pre-defined data standards; and performing the self-diagnosis (910), comprising: identifying a determined performance of one or more of the behavioral models as below a threshold of performance, as a trigger for executing the self-updation of the one or more behavioral models; identifying a determined performance level of the industrial plant below a defined benchmark of performance of the industrial plant as a trigger for executing the optimization of the industrial plant; identifying a determined deviation of one or more of a plurality of plant components from a defined benchmark of performance of components as a trigger for executing the predictive maintenance of one or more of the plurality of plant components; and identifying that the one or more users is to be alerted, if at least one triggering condition is detected.

10. The processor implemented method of monitoring an industrial plant as claimed in claim 8, wherein recommending the self-updation of one or more behavioral models comprises: determining quality of one or more model predictions generated by the one or more behavioral models; and invoking a self-learning mechanism if the determined quality of at least one of the one or more behavioral models is below a threshold of quality of behavioral model, wherein the self-learning mechanism updates at least one of the one or more behavioral models.

11. The processor implemented method of monitoring an industrial plant as claimed in claim 8, wherein generating each of the one or more behavioral models comprising: collecting real-time data representing characteristics of working of the industrial plant; collecting and storing data representing working of the industrial plant in past instances, as historical data; generating pre-processed data by pre-processing the real-time data and the historical data; simulating values of non-measurable parameters of the industrial plant, by using physics based or data based models; generating an integrated data by combining the pre-processed data and the simulated data; and generating each of the data based models using the integrated data.

12. The processor implemented method of monitoring an industrial plant as claimed in claim 11, wherein one or more workflows are generated for an application based on the self-monitoring, comprising; creating at least one workflow for the application, wherein the workflow is saved in the form of a workflow graph; executing the one or more workflows, comprising executing for each of a plurality of nodes in the workflow graph: traversing the workflow graph; executing an algorithm; displaying values of a plurality of algorithm parameters as result of execution of the algorithm saving results in a form of a transformed data model, the algorithm parameters or an update to knowledge database; displaying the results and subsequently move to a next node, among the plurality of nodes, in the workflow graph; and repeating steps of the creating at least one workflow for the application, the traversing the workflow graph, the executing the algorithm and the displaying the values of the plurality of algorithm parameters as result of execution until all the plurality of nodes in the workflow graph are executed.

13. A computer program product comprising a non-transitory computer readable medium having a computer readable program embodied therein, wherein the computer readable program, when executed, causes a computing device to perform: monitoring a plurality of components of an industrial plant, via one or more hardware processors; and performing a self-monitoring of the industrial plant, wherein the self-monitoring comprises a self-diagnosis comprising the steps of: determining operation of any of a plurality of industrial plant components outside a pre-defined range of operation in a multi-layered interacting structure, as a deviation from a pre-defined normal range of operation of each of the plurality of industrial plant components, using the one or more hardware processors, wherein a determined performance is compared with an expected performance to determine the deviation, wherein when the determined deviation is below a threshold of the deviation, then working of a component is in a 'normal range' of operation, wherein when the determined deviation exceeds the threshold of the deviation, then working of the component is 'outside the pre-defined normal range of operation', and wherein the plurality of industrial plant components includes sensors, actuators, and controllers, monitoring the determined performance separately at component level and at plant level continuously, wherein upon determining quality of plant data, soft sensors substitutes lack of quality of data in case physical sensors are found to be faulty or non-functional, wherein the soft sensors, are digital twins of the physical sensors, are monitored continuously to ascertain performance and corresponding behavioral models are updated; and recommending at least one action in response to the determined deviation from the pre-defined normal range of operation, via the one or more hardware processors, wherein the action is one or more of a) optimization of the industrial plant, b) predictive maintenance of at least one of the plurality of components, c) generating an alert for one or more users, and d) self-updation of one or more behavioral models that affect performance of the industrial plant wherein the recommended at least one action is triggered, wherein the alert is generated upon identifying one or more pre-defined types of events occurred or predicted to occur in a prediction horizon and the alert contains information about an event and one or more recommendations to assist the one or more users or an operator, wherein the one or more behavioral models represent a prediction model, a classification model, an optimization model used to represent behavior of the industrial plant, detecting trigger conditions for the at least one action in terms of values of different parameters or combination of parameters, as configured, wherein the trigger conditions comprises: determining whether a previously triggered self-optimization execution is in progress or being implemented; waiting till the previously triggered self-optimization execution is terminated in response to determining that the previously triggered self-optimization execution is in progress; triggering a self-optimization in response to determining that there is no ongoing execution; determining whether a time elapsed after a previous execution exceeded a threshold of time; triggering the self-optimization execution in response to determining that the time elapsed after the previous execution exceeded the threshold of time; waiting to trigger the self-optimization execution till the time elapsed exceed the threshold of time, in response to determining that the time elapsed after the previous execution is within the threshold of time; wherein the trigger conditions are defined in terms of model quality parameters, upon detecting that a new regime has been flagged and change in raw materials, wherein determining the deviation and recommending the at least one action comprises: performing analysis of industrial plant data, comprising: determining whether a determined quality of the industrial plant data meets a defined threshold of quality of plant data, wherein the determined quality of the industrial plant data not meeting the defined threshold of quality of plant data is considered as an instance of bad quality of data; generating additional data to compensate for any determined instance of bad quality of data to improve quality of the industrial plant data, wherein a self-organizing system is configured to function at multiple levels including a lowest level and a global level, wherein at the lowest level, the self-organizing system monitors plant measurements of process variables, actuator signals, or controller outputs using their corresponding soft sensors and at the global level, the self-organizing system monitors a complete industrial plant comprising of a plurality of assets, operations or processes that are carried out in the industrial plant, materials and their flow, an environment in which the industrial plant operates, the one or more users operating the industrial plant, and automation systems that operate at an individual asset or operation level, to optimize performance of the complete industrial plant at the global level, wherein the self-organizing system uses the industrial plant data and predictions of the one or more behavioral models to monitor the soft sensors for degradation in their predictive capabilities which are caused due to a plurality of factors including a physical failure of a sensor, inappropriate or infrequent calibration of the sensor, degradation of the predictive capabilities of the behavioral model of the sensor, wherein industrial plant operators act upon the predictions of the one or more behavioral models to adjust quality of the industrial plant data, wherein the self-organizing system provides real-time decisions to the industrial plant operators for optimization of Key Performance Indicators (KPIs) related to a physical system or process under consideration by working with a physical entity including the assets, a unit operation or the complete industrial plant, wherein the self-organizing system is deployed and updated further to enhance decision making capabilities for future requirements, wherein simulated data is archived with corresponding real-time data in a knowledge-base for the industrial plant for future use.

14. The computer program product comprising a non-transitory computer readable medium having a computer readable program embodied therein as claimed in claim 13, wherein execution of the computer readable program causes determining the deviation and recommending the at least one action, by performing the self-monitoring by: collecting industrial plant data from each of the plurality of components of the industrial plant; pre-processing the industrial plant data, wherein pre-processing the industrial plant data comprises conditioning the industrial plant data to meet pre-defined data standards; and performing the self-diagnosis, comprising: identifying a determined performance of one or more of the behavioral models as below a threshold of performance, as a trigger for executing the self-updation of the one or more behavioral models; identifying a determined performance level of the industrial plant below a defined benchmark of performance of the industrial plant as a trigger for executing the optimization of the industrial plant; identifying a determined deviation of one or more of the plurality of plant components from a defined benchmark of performance of components as a trigger for executing the predictive maintenance of one or more of the plurality of plant components; and identifying that the one or more users is to be alerted, if at least one triggering condition is detected.

15. The self-organizing system as claimed in claim 1, wherein the industrial plant is a sinter plant and monitoring ignition temperatures in real-time to check if measurements are within prescribed limits, when the measurements are lower than prescribed limits due to failure of one of a plurality of thermocouples, performing an advanced multivariate data preprocessing analysis involving all ignition hood temperature measurements, wherein when a root cause is identified to be thermocouple burnout in one of the plurality of thermocouples, then the industrial plant operators are alerted and simultaneously, the soft sensor for the ignition temperature for a failed thermocouple is activated and soft-sensor data substitutes incorrect data coming from the failed thermocouple and a prediction of Tumbler Index continues with soft-sensed values of the ignition temperature instead of incorrect measured values and the industrial plant operators act upon the prediction of Tumbler Index to adjust sinter quality, wherein a plurality of activities performed by the self-organizing system upon receiving the pre-processed industrial data comprises identification of a current state of the industrial plant, determination of time lags that provide an estimate of effect of a particular independent process variable or a set of variables on a dependent variable or a set of dependent variables, identification of a regime of operation of a plant, detection of anomalies in a health or condition of the equipment to provide appropriate advice to the operator to carry out maintenance activities of the equipment, identification of key factors that are causing degradation of industrial plant performance through real-time root cause analysis, extracting features from signals or time series data from the sensors and utilizing the extracted features to provide insights to the operators or to provide as inputs to the one or more behavioral models of the self-organizing system.

* * * * *